United States Patent
Atta et al.

(10) Patent No.: US 12,545,757 B1
(45) Date of Patent: Feb. 10, 2026

(54) METHOD FOR PREPARING A CLAY-POLYMER COMPOSITE

(71) Applicant: KING SAUD UNIVERSITY, Riyadh (SA)

(72) Inventors: Ayman Mohamady Atta, Riyadh (SA); Ali Kanakhr Aldalbahi, Riyadh (SA); Abdelrahman Osama Ezzat, Riyadh (SA); Hamad Abdullah Al-Lohedan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/003,274

(22) Filed: Dec. 27, 2024

(51) Int. Cl.
| | |
|---|---|
| C09K 21/14 | (2006.01) |
| B32B 5/02 | (2006.01) |
| C01B 33/44 | (2006.01) |
| C08B 9/02 | (2006.01) |
| C08F 292/00 | (2006.01) |
| C08K 3/36 | (2006.01) |

(52) U.S. Cl.
CPC .................. C08F 292/00 (2013.01)

(58) Field of Classification Search
None
See application file for complete search history.

(56) References Cited

U.S. PATENT DOCUMENTS

| | | | |
|---|---|---|---|
| 2008/0045420 A1 | 2/2008 | Karagianni et al. | |
| 2020/0123025 A1* | 4/2020 | El-Masri | B01J 20/28007 |

FOREIGN PATENT DOCUMENTS

| | | | |
|---|---|---|---|
| CN | 105107477 A | * | 12/2015 |
| CN | 113184867 A | | 7/2021 |
| CN | 115418205 A | | 12/2022 |
| CN | 115677925 B | * | 4/2024 |
| WO | WO 2014/123709 A1 | * | 8/2014 |

OTHER PUBLICATIONS

Zhao, X., et al., "Zwitterionic Polymer P(AM-DMC-AMPS) as a Low-Molecular-Weight Encapsulator in Deepwater Drilling Fluid"; Applied Sciences, 7:594 Jun. 8, 2017.
Sun, J., et al., "Salt-Responsive Zwitterionic Polymer Brush Based on Modified Silica Nanoparticles as a Fluid-Loss Additive in Water-Based Drilling Fluids"; Energy & Fuels, 34(2): pp. 1669-1679, 2020. Abstract.
Al-Homadhi, E. S., "Improving Local Bentonite Performance for Drilling Fluids Applications"; J. of King Saud U.—Eng. Sci., 21(1): pp. 45-53 (2009).
Li, Y., et al., "A Novel Oil-In-Water Nanoemulsion as a High-Temperature Plugging Agent for Wellbore Wettability Alteration and Strengthening"; Journal of Molecular Liquids, 384(15):122273, Aug. 15, 2023. Abstract.
Saleh, T. A., et al., "Hydrophobic Polymer-Modified Nanosilica as Effective Shale Inhibitor for Water-Based Drilling Mud"; Journal of Petroleum Science and Engineering, 209:109868, Feb. 2022.

* cited by examiner

*Primary Examiner* — Tae H Yoon
(74) *Attorney, Agent, or Firm* — Nath, Goldberg & Meyer; Joshua B. Goldberg

(57) ABSTRACT

A method of modifying natural clay. The method including mixing an amount of Bentonite or Kaolinite clay with a hydrochloride hydrogen nitrate mixture and stirring to obtain a powder, treating the powder with a piranha solution to obtain second reaction mixture and stirring to obtain hydroxyl terminated clay. The method also included aminating hydroxyl terminated clay or grafting the vinyl. The method also includes isolating zwitterions and positive and negative ions of the aminated hydroxyl terminated clay. The method also includes polymerizing the vinyl grafted hydroxyl terminated clay.

7 Claims, 28 Drawing Sheets

(a)

(b)

(c)

(d)

(b)

(c)

METHOD FOR PREPARING A CLAY-POLYMER COMPOSITE

BACKGROUND

1. Field

The disclosure of the present patent application relates to a method for modifying natural clay and, particularly, to an effective method of increasing hydrophobicity of natural clay.

2. Description of the Related Art

Clays minerals have attracted great attention due to the ability to modify their structures for use in several industrial applications such as polymer composites, drug delivery and drilling muds technology. The natural clay minerals, however, have narrow layer spacing, high surface energy and hydrophilicity, that limiting its further application.

Clay minerals include hydrous aluminum silicate with a layer (sheet-like) structure and very small particle size. There are several types of clay minerals, such as bentonite, montmorillonite, vermiculite, sepiolite, chlorite, phyllosilicate, kaolinite, palygorskite, and glauconite. The various types of clay minerals include different ratios of tetrahedral and octahedral silicate sheets in which the anions at the exposed surface of the octahedral sheet are hydroxyl groups. The microscopic structures of smectite clays, often called swelling clays, are composed of negatively charged silicate layers interacting with interlayer cations and adsorbing water molecules. The impact of the water molecules on the swelling clay structure is observed in smectites with different physical states (shales, pasty muds, gels and dilute aqueous solutions) as a function of the hydration state.

There is a need to modify the clay minerals' hydrophobicity to facilitate use in water-based drilling muds.

For example, silane grafting, also known as silylation, was an efficient technique used to modify clay mineral surfaces. In this method, several silanes are anchored onto clay mineral surfaces through a condensation reaction between the hydroxyls in hydrolyzed silanes and the silanol groups on clay mineral surfaces. The covalent bond enables a durable immobilization of the organic moieties, preventing their leaching into the surrounding solutions or thermal leaching or degradation. On the other hand, the introduced functional groups on silylated clay minerals can react with the polymer matrix, resulting in the formation of a network among clay mineral, silane, and polymer via covalent bonds.

The western region of the Kingdom of Saudi Arabia has an abundant amount of low-quality clay. Argiclay is essentially composed of argillaceous crystalline hydrous aluminum silicates containing Na, K, and Ca in which Mg and Fe may be substituted for Al. The most common commercial clay minerals are kaolinite, montmorillonite, and illite. Natural clays, such as clay stone or mudstone, include several clay minerals with one or more impurities such as free iron oxide minerals, amorphous silica and alumina, quartz grain, limestone, gypsum and other more soluble salts. These impurities affect clay characteristics and may adversely affect its use in specific applications.

Thus, a method for increasing hydrophobicity of clay is needed.

SUMMARY

The present teachings are directed to a method of preparing a clay-polymer composite, comprising hydroxylating natural clay and polymerizing the hydroxylated natural clay with monomers selected from the group consisting of 1-(4-sulfobutyl)-3-vinyl-1H-imidazole-3-ium butane-1-sulfonate (SBVI), acrylamidopropyl trimethylammonium chloride (APTAC), and 2-acrylamide-2-methylpropane sodium sulfate (AMPS-Na). The modified clay minerals demonstrate improved thermal stability and dispersion in seawater, as well as improved hydrophobicity.

An embodiment for preparing clay-polymer composite includes collecting clay minerals based on kaolinite and montmorillonite, modifying the clays to provide amino or vinyl modified clays, and polymerizing the amine or vinyl modified clays. The hydroxyl groups of kaolinite and montmorillonite minerals can be modified either with 3-aminopropytrimethoxysilne (APTS) or with acrylonitrile to insert amino and vinyl groups, respectively. The amine and vinyl modified clay minerals can be added and polymerized to monomers selected from the group consisting of zwitterionic, cationic and anionic monomers. In an embodiment, the monomers are selected from the group consisting of 1-(4-Sulfobutyl)-3-vinyl-1H-imidazole-3-ium butane-1-sulfonate (SBVI), 3-acrylamidopropyl trimethylammonium chloride (APTAC) and 2-acrylamide-2-methylpropane sodium sulfate (AMPS-Na).

The present disclosure relates to a method of modifying natural clay. The method includes mixing an amount of Bentonite clay or Kaolinite clay with a hydrochloride hydrogen nitrate mixture to obtain a first reaction mixture, method also includes stirring the first reaction mixture to obtain a powder, treating the powder with a piranha solution to obtain a second reaction mixture, stirring the second reaction mixture to obtain hydroxyl terminated clay; washing the hydroxyl terminated clay, aminating the hydroxyl terminated clay by mixing the hydroxyl terminated clay with 3-aminopropytrimethoxysilane (APTS) in ethanol to obtain a third reaction mixture and refluxing, cooling, and centrifuging the third reaction mixture to obtain aminated hydroxyl terminated clay. The method also includes drying aminated hydroxyl terminated clay.

The present disclosure also relates to a method of grafting vinyl groups on the hydroxyl terminated clay. The method comprises sonicating hydroxyl terminated clay with $H_2O$/DMSO to obtain a seventh reaction mixture; adding acrylonitrile (AN) to the seventh reaction mixture to obtain an eighth reaction mixture; adding concentrated HCl to the eighth reaction mixture to obtain a ninth reaction mixture; and purifying the ninth reaction by centrifuging and washing to obtain a vinyl grafted hydroxyl terminated clay.

These and other features of the present subject matter will become readily apparent upon further review of the following specification.

DETAILED DESCRIPTION OF THE PREFERRED EMBODIMENTS

Figure 1A:
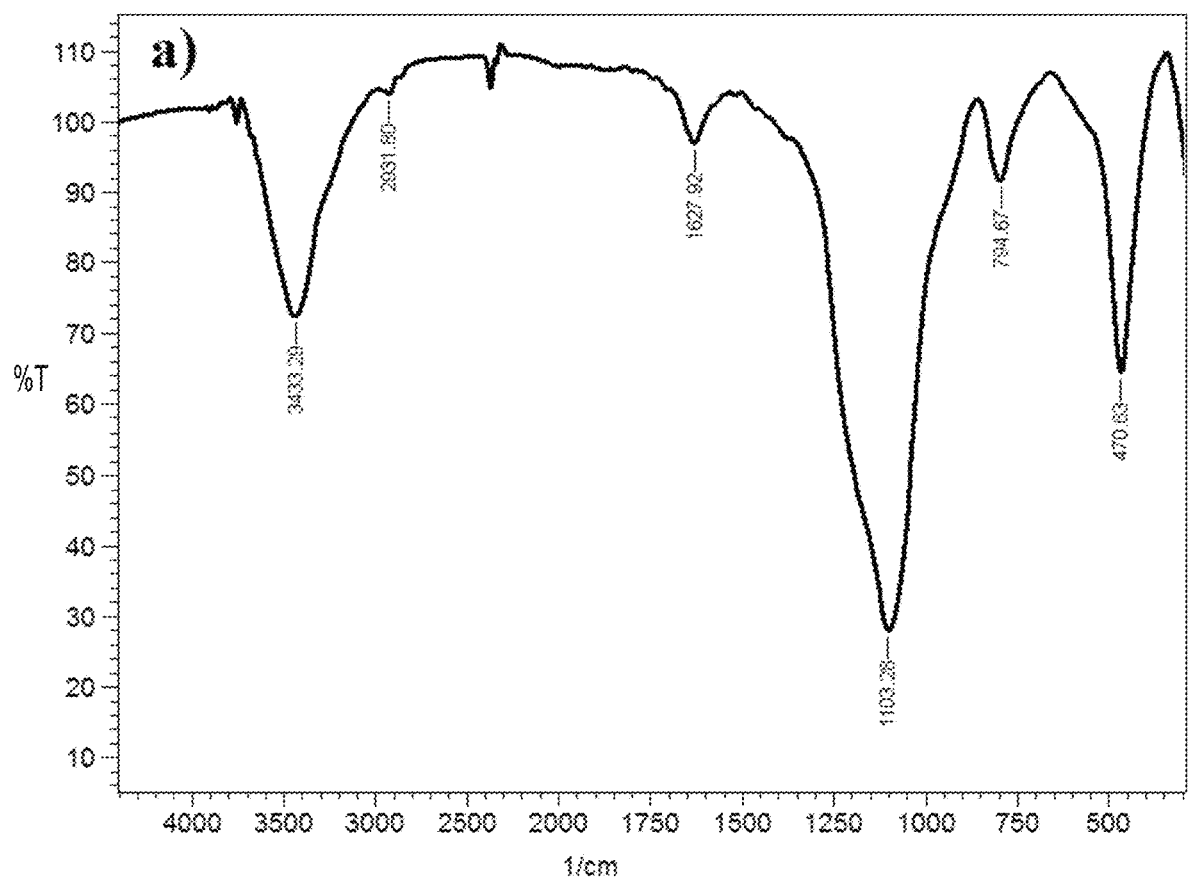
FIGS. 1A-1E show FTIR spectra of A) HBT, B) AHBT, C) AHBT-SBVI, D) AHBT-AMPS-Na, and E) AHBT-APTAC.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise. In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present teachings are directed to a method of preparing a clay-polymer composite, comprising hydroxylating natural clay and polymerizing the hydroxylated natural clay with monomers selected from the group consisting of 1-(4-sulfobutyl)-3-vinyl-1H-imidazole-3-ium butane-1-sulfonate (SBVI), acrylamidopropyl trimethylammonium chloride (APTAC), and 2-acrylamide-2-methylpropane sodium sulfate (AMPS-Na).

In an embodiment, hydroxylating the natural clay comprises mixing an amount of clay with a hydrochloride hydrogen nitrate mixture to obtain a first reaction mixture; stirring the first reaction mixture to obtain a powder, treating the powder with a piranha solution to obtain a second reaction mixture, and stirring the second reaction mixture to obtain hydroxyl terminated clay.

In an embodiment, polymerizing the hydroxylated clay comprises aminating the hydroxylated clay and polymerizing the aminated hydroxylated to provide the clay-polymer composite. In an embodiment, aminating the hydroxylated clay comprises mixing the hydroxyl terminated clay with 3-aminopropytrimethoxysilne (APTS) in ethanol.

In the present disclosure, local clays taken from different regions of Saudi Arabia based on kaolinite and montmorillonite were modified to apply in the drilling muds. Saudi white and grey clay minerals based on kaolinite and montmorillonite were modified with acidic hydrogen peroxide solution to increase their hydroxyl groups contents and to remove water bonded among silicate layers. The hydroxyl groups of kaolinite and montmorillonite minerals were modified either with 3-aminopropytrimethoxysilane (APTS) or with acrylonitrile to insert amino and vinyl groups, respectively. The amine and vinyl modified clay minerals were added and polymerized to zwitterionic, cationic and anionic monomers based on 1-(4-Sulfobutyl)-3-vinyl-1H-imidazole-3-ium, 3-acrylamidopropyl trimethylammonium chloride (APTAC) and 2-acrylamide-2-methylpropane sodium sulfate (AMPS-Na). The dispersion of modified Saudi clay minerals in seawater, filter loss and viscosity were measured to investigate their application in the drilling mud formulations.

The present disclosure relates to a method of modifying natural clay to improve properties of the clay, such as increasing hydrophobicity of the clay. The method includes mixing an amount of clay with a hydrochloride hydrogen nitrate mixture $HCl:HNO_3$ to obtain a first reaction mixture, stirring the first reaction mixture to obtain a powder, treating the powder with a piranha solution to obtain a second reaction mixture, stirring the second reaction mixture to obtain hydroxyl terminated clay; and washing the hydroxyl terminated clay. The method may include aminating the hydroxylated clay by mixing the hydroxyl terminated clay with 3-aminopropytrimethoxysilne (APTS) in ethanol to obtain a third reaction mixture. The method may also include refluxing, cooling, and centrifuging the third reaction mixture to obtain aminated hydroxyl terminated clay; and drying the aminated hydroxyl terminated clay.

In various embodiments, the clay is selected from the group consisting of Bentonite clay and Kaolinite clay.

In further embodiments, the amount of clay may be at least about 30 g.

In another embodiment, the HCl:HNO3 mixture may have a ratio of 3:1 v/v.

In other embodiments, 400 mL of the $HCl:HNO_3$ may be added to the amount of clay.

In various embodiments, piranha solution may include $H_2SO_4:H_2O_2$ having a ratio of at least about 3:1-7:1 v/v. By non-limiting example, the piranha solution may also be referred to as piranha etch.

In further embodiments, stirring the first reaction mixture may occurs for at least about one hour and may further include vacuum filtering the first reaction mixture.

In another embodiment, the powder may be treated with the Piranha solution for at least about 30 minutes to at least about 24 hours under a constant temperature of at least 90° C. and constant stirring.

In other embodiments, the hydroxyl terminated clay may be washed with water.

In various embodiments, the hydroxyl terminated clay may be dried for at least about 4 hours.

In one embodiment, the method may include adding 1-(4-sulfobutyl)-3-vinyl-1H-imidazole-3-ium butane-1-sulfonate (SBVI) to the aminated hydroxylated clay in ethanol to obtain a fourth reaction mixture; refluxing the fourth reaction mixture to separate one or more zwitterions from the aminated hydroxyl clay; and obtaining the clay-polymer composite. In an embodiment, the clay-polymer composite comprises aminated hydroxyl-terminated bentonite (AHBT) and 1-(4-sulfobutyl)-3-vinyl-1H-imidazole-3-ium butane-1-sulfonate (SBVI) (herein, AHBT-SBVI). In an embodiment, the clay-polymer composite comprises aminated hydroxyl-terminated Kaolinite (AHKT) (herein, AHKT-SBVI).

Said another way the method may be described as in Scheme 1 below:

Scheme 1

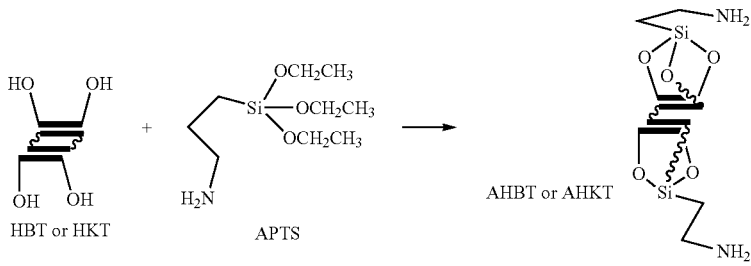

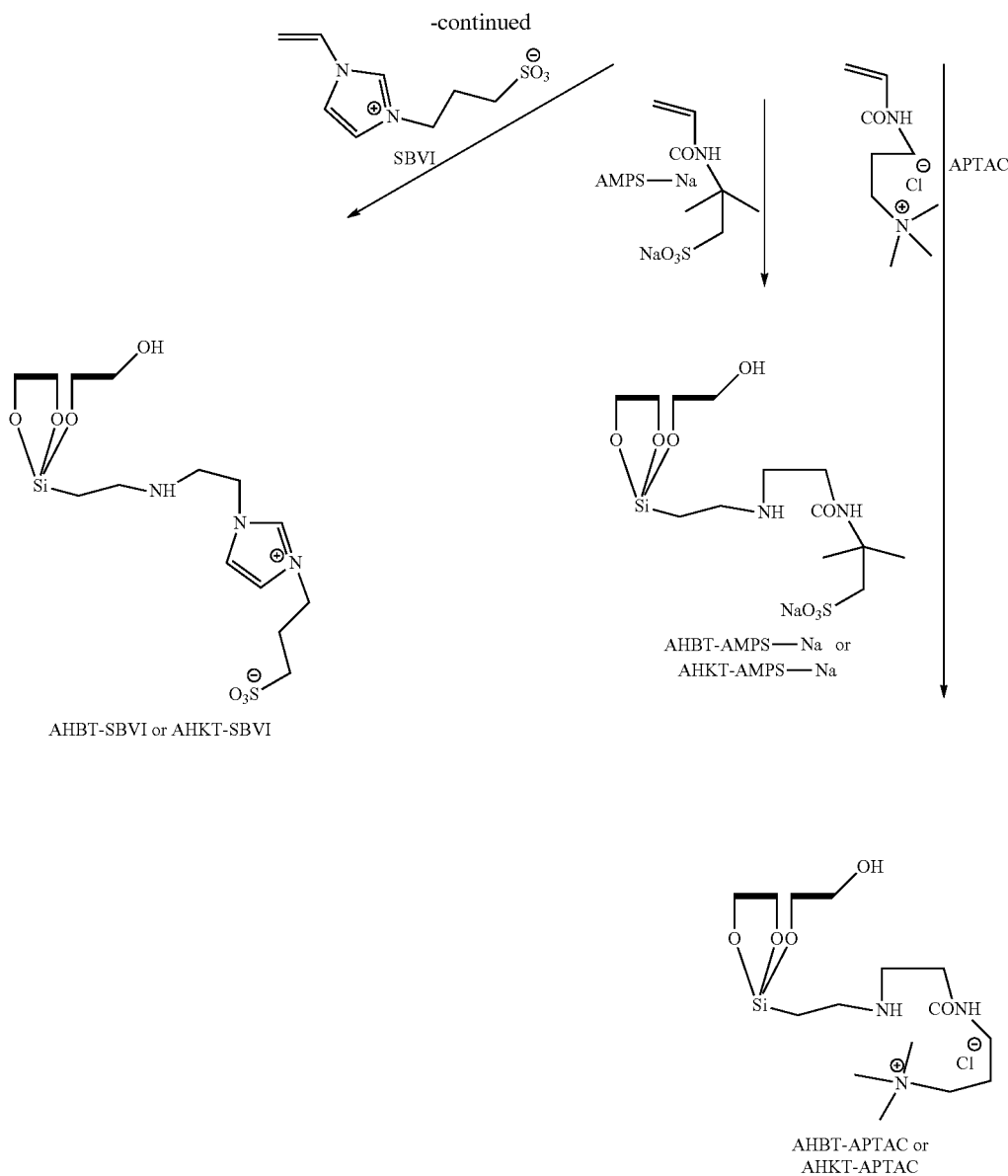

In an embodiment, the method may include preparing a clay-polymer composite including positively charged clay minerals. The method may include adding acrylamidopropyl trimethylammonium chloride (APTAC) to the aminated hydroxylated clay in ethanol to obtain a fourth reaction mixture, refluxing the fourth reaction mixture to separate one or more zwitterions from a positively charged aminated hydroxyl clay; and obtaining the clay-polymer composite. In an embodiment, the clay-polymer composite comprises aminated hydroxyl-terminated bentonite (AHBT) and acrylamidopropyl trimethylammonium chloride (APTAC) (herein, AHBT-APTAC). In an embodiment, the clay-polymer composite comprises aminated hydroxyl-terminated Kaolinite (AHKT) and acrylamidopropyl trimethylammonium chloride (APTAC) (herein, AHKT-APTAC).

In an embodiment, the method may include preparing a clay-polymer composite including negatively charged clay minerals. The method may include adding 2-acrylamide-2-methylpropane sodium sulfate (AMPS-Na) to the aminated hydroxyl clay in ethanol to obtain a sixth reaction mixture, refluxing the sixth reaction mixture to separate zwitterions from positively charged aminated hydroxyl clay; and obtaining the clay-polymer composite. In an embodiment, the clay-polymer composite comprises aminated hydroxyl-terminated bentonite (AHBT) and 2-acrylamide-2-methylpropane sodium sulfate (AMPS-Na) (herein, AHBT-AMPS-Na). In an embodiment, the clay-polymer composite comprises aminated hydroxyl-terminated Kaolinite (AHKT) and 2-acrylamide-2-methylpropane sodium sulfate (AMPS-Na) (herein, AHKT-AMPS-Na).

Functionalization of clay with zwitterion, positive negative charged polymers may be understood by referring to Scheme 2 below:

Scheme 2

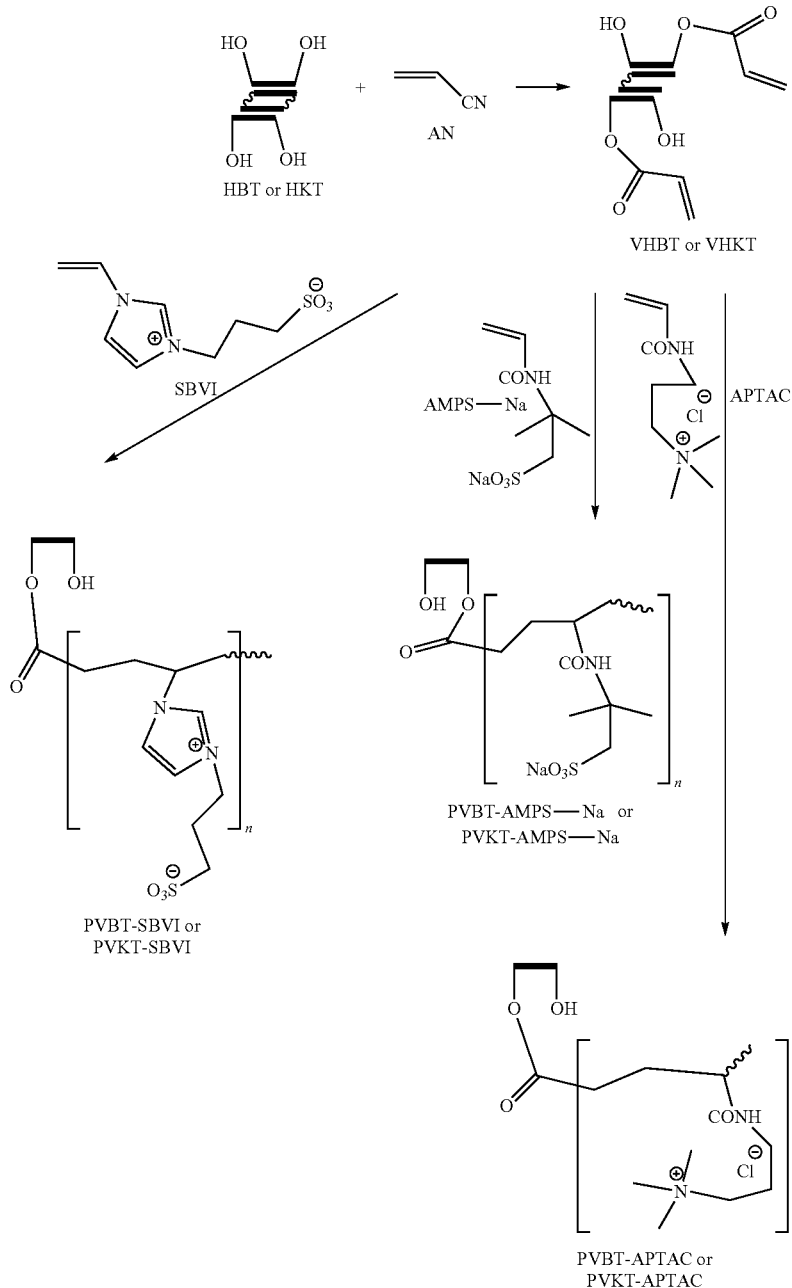

In another embodiment, the method may include grafting vinyl groups on the hydroxyl terminated clay by sonicating hydroxyl terminated clay with $H_2O$/DMSO to obtain a seventh reaction mixture, adding acrylonitrile (AN) to the seventh reaction mixture to obtain an eighth reaction mixture, adding concentrated HCl to the eighth reaction mixture to obtain a ninth reaction mixture, and purifying the ninth reaction mixture by centrifuging and washing to obtain a vinyl grafted hydroxyl terminated clay.

In other embodiments, hydroxylated bentonite clay (HBT) may be grafted with vinyl groups. The method may include sonicating HBT in $H_2O$/DMSO to obtain a fourth reaction mixture, adding acrylonitrile (AN) to the fourth reaction mixture to obtain a fifth reaction mixture, and adding concentrated HCl under stirring overnight to the fifth reaction mixture to obtain a sixth reaction mixture. The method may also include purifying the sixth reaction by centrifuging and washing with water to obtain a vinyl grafted hydroxyl terminated clay.

In further embodiments, hydroxylated Kaolinite clay (HKT) may be grafted with vinyl groups. The method may include sonicating HKT $H_2O$/DMSO to obtain a fourth reaction mixture, adding acrylonitrile (AN) to the fourth reaction mixture to obtain a fifth reaction mixture, adding concentrated HCl under stirring overnight to the fifth reaction mixture to obtain a sixth reaction mixture and purifying the sixth reaction by centrifuging and washing with water to obtain a vinyl grafted hydroxyl terminated clay.

In another embodiment, the method may include polymerizing the VHBT by sonicating the VHBT in water with one compound selected from the group consisting of 1-(4-sulfobutyl)-3-vinyl-1H-imidazole-3-ium butane-1-sulfonate (SBVI), acrylamidopropyl trimethylammonium chloride (APTAC) and 2-acrylamide-2-methylpropane sodium sulfate (AMPS-Na), and N—N-methylenebisacrylamide (MBA), N,N,N',N'-tetramethyl ethylenediamine (TMD), and ammonium persulfate (APS) in the presence of nitrogen gas and obtaining polymerized VHBT.

In other embodiments, the method of modifying natural clay may further include polymerizing VHBT. The method may include sonicating the VHKT in water with one compound selected from the group consisting of 1-(4-sulfobutyl)-3-vinyl-1H-imidazole-3-ium butane-1-sulfonate (SBVI),-acrylamidopropyl trimethylammonium chloride (APTAC) and 2-acrylamide-2-methylpropane sodium sulfate (AMPS-Na), and N—N-methylenebisacrylamide (MBA), N,N,N',N'-tetramethyl ethylenediamine (TMD), and ammonium persulfate (APS) in the presence of nitrogen gas and obtaining polymerized VHKT.

The methods described may be further understood by the Examples below.

EXAMPLES

Materials

Two different clays, locally named grey clay and white clay, were supplied from Al-Khobar, Eastern, Saudi Arabia (ASH Group) as Bentonite and Kaolinite. The white clay and the red clays were collected from Gamgom quarries, in the western region of Jaddah. The grey clays were collected from Mahael quarry, in Shamer Mountain, Elmadina. All chemicals were purchased from Sigma-Aldrich chemicals Co. N-vinyl imidazole, 1,4-butane sultone, -acrylamidopropyl trimethylammonium chloride (APTAC), 2-acrylamide-2-methylpropane sodium sulfate (AMPS-Na), 3-aminopropyltrimethoxy silane (APTS), tetraethoxysilane (TES), N—N-methylenebisacrylamide (MBA), N,N,N',N'-tetramethyl ethylenediamine (TMD), ammonium persulfate (APS) and acrylonitrile (AN) were used without further purification.

Zwitterion monomer based on 1-(4-sulfobutyl)-3-vinyl-1H-imidazole-3-ium butane-1-sulfonate (SBVI) was prepared as previously reported. About 1 g of vinyl imidazole (0.21 mM) and 1.36 g of 1,4-butane sultone (0.18 mM) at the molar ratio of 1:1 were mixed with 20 mL of acetone as solvent. Then, the solution was magnetically stirred for 1 h at room temperature. After 1 h at room temperature, diethyl ether was added to the solution to wash the unwanted by-products and unreacted reactants. Despite diethyl ether addition, no sediments were observed. Therefore, the solution was put at 40-50° C. to let the solvents (acetone and diethyl ether) evaporate completely. After the evaporation of solvents, the clear color of solution gradually turned yellow. Seawater was collected from Arabic Gulf, Dammam, Saudi Arabia. A typical mixture concentrated sulfuric acid (98%) to 30% hydrogen peroxide solution were prepared as 3:1-7:1 volume percentages. The mixtures were prepared by adding sulfuric acid first, followed by the peroxide under cooling.

Example 1

Preparation of Hydroxyl Terminated Clay

The Bentonite or Kaolinite (30 g) was reacted with 400 mL of freshly prepared $HCl:HNO_3$—3:1, v:v. The solution underwent constant stirring for one hour and was then vacuum filtered. The solid powder was reacted with 180 mL of freshly prepared Piranha solution ($H2SO4:H2O2$—3:1-7:1 volume percentages) and treated for 30 min to 24 h under a constant temperature of 90° C. and constant stirring. The solid powder was washed with water and dried for 4 h to produce hydroxyl terminated Bentonite (HBT) and Kaolinite (HKT).

Example 2

Amination of Hydroxyl Terminated Clay

The amination of clay minerals was carried out by using APTS. HBT, and HKT (2 g) were separately mixed with (1.6 g) APTS in the presence of (40 mL) ethanol. The reaction mixture was refluxed for 10 hours and cooled to separate the powder by centrifuge, then dried at 80° C. for 12 hours. The aminated HBT and HKT were abbreviated as AHBT and AHKT, respectively.

The AHBT and AHKT were reacted with SBVI, APTAC and AMPS-Na to produce charged clay minerals with zwitterion, positively and negatively charged monomers. In this respect, AHBT or AHKT (1 g) was added to SBVI (1 g) in ethanol (20 mL) at room temperature for 24 hours and then refluxed for 6 hours to separate the zwitterion clay minerals of AHBT and AHKT to isolate AHBT-SBVI and AHKT-SBVI, respectively. The same procedure was repeated in the presence of AMPS-Na and APTAC to produce negative and positive charge clay minerals. The negative charged AHBT and AHKT with AMPS-Na were designated as AHBT-AMPS-Na and AHKT-AMPS-Na, respectively. On the other hand, the positive charged AHBT and AHKT with APTAC were designated as AHBT-APTAC and AHKT-APTAC, respectively.

Example 3

Grafting of Hydroxyl Terminated Clay with Vinyl Group

AN was used to graft the hydroxyl terminated clay minerals HBT and HKT to graft the with vinyl groups on the clay mineral surfaces and polymerize with SBVI, APTAC and AMPS-Na. In this respect, HBT (0.75 g) was sonicated in 30 mL ($H_2O$/DMSO; 2/1 volume %) for 30 seconds, then AN (6 mL) was added, followed by 2.5 mL (concentrated HCl) under stirring overnight. After that, the reaction was purified using centrifuge and washed with water and DMSO mixture. The vinyl HBT graft was abbreviated as VHBT.

The HKT (0.2 g) was sonicated in 10 ml ($H_2O$/DMSO) for 30 seconds, then AN (2 mL) was added to the reaction mixture, followed by adding (1.25 mL) concentrated HCl under stirring overnight. After that, the reaction was purified using centrifuge and washed with water DMSO mixture. The vinyl HKT graft was abbreviated as VHKT. The VHBT or VHKT was polymerized with SBVI, APTAC and AMPS-Na in the absence and presence of MBA crosslinker using APS and TEMED as radical initiator and activator, respectively. In this respect, VHBT or VHKT (1-5 g) was sonicated in water (100 mL) and (1-5 g) of SBVI, APTAC or AMPS-Na, MBA (from 0 to 10 Wt. % of monomer weight), APS (1 Wt. % of total weights of monomers) and TEMEDD (15 μL) in the presence of nitrogen gas. The powder was separated by centrifuge and washed with acetone, ethanol several times to obtain polymerized VHKT or VHBT with SBVI, APTAC and AMPS-Na. The polymerized VHBT with SBVI, APTAC and AMPS-Na were designated as PVBT-SBVI, PVBT-APTAC and PVBT-AMPS-Na, respectively. The polymerized VHKT with SBVI, APTAC and AMPS-Na were designated as PVKT-SBVI, PVKT-APTAC and PVKT-AMPS-Na, respectively.

Example 4

Characterization

The chemical structures of the modified clay were confirmed using Fourier transform infrared (FTIR) spectrometer (Nicolet, NEXUS-670). The intercalation and exfoliation of modified clay were performed using wide-angle X-ray diffraction (WAX; Rigaku D/MAX-3C OD-2988N X-ray diffractometer; CuKα radiation; λ=0.15418 at 40 kV and 30 mA). The morphology of modified clay was investigated using scanning electron microscopy (SEM, model JSM-T 220A, JEOL) at an accelerated voltage 10-20 kV. Thermal stability of the modified clay was determined using thermogravimetric analysis (TGA-50 SHIMADZU) at a heating rate of 10° C./min. Zeta potentials of the of the modified clay are measured in aqueous solution in the presence of KCl (0.01 M) based on Laser Zeta meter using dynamic light scatter (DLS Malvern Instruments Model Zetasizer 2000) measurements beside particle sizes and their polydispersity index (PDI).

Figure 1B:
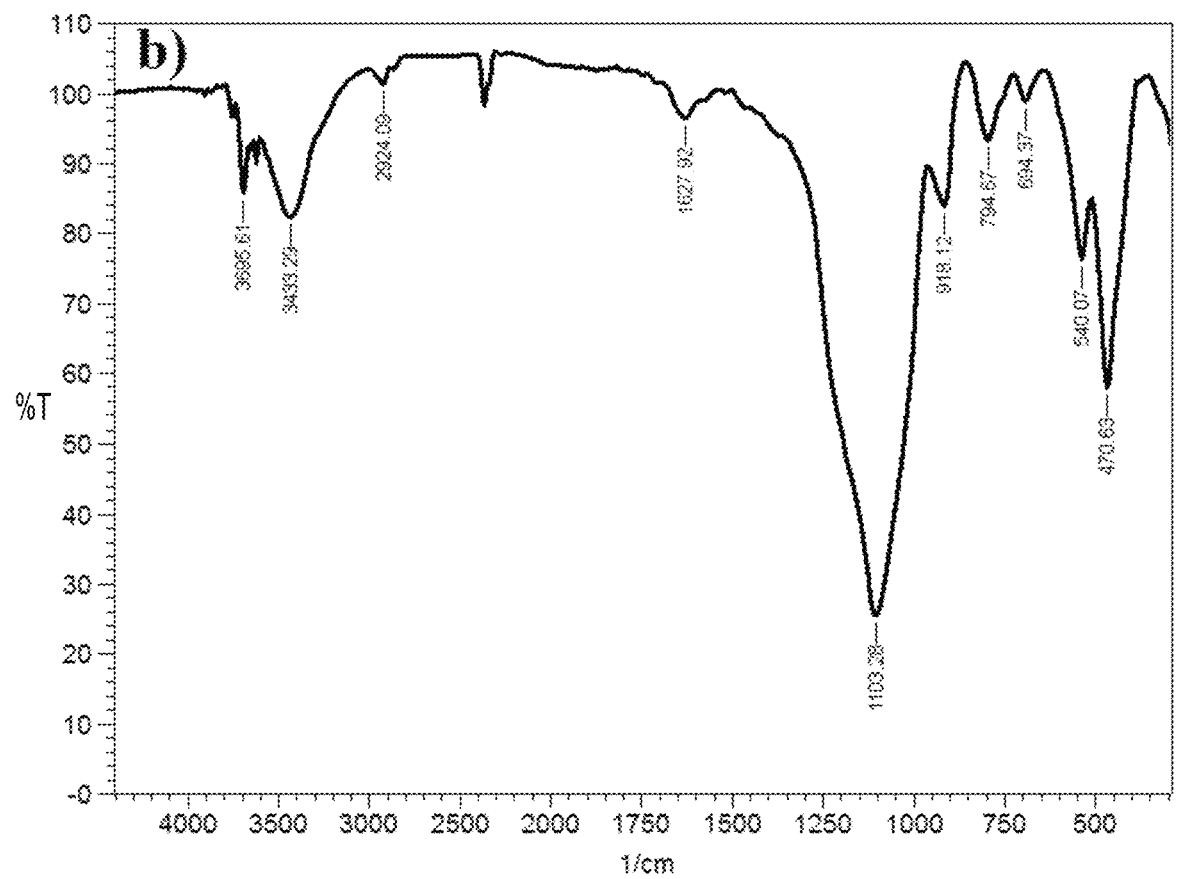
Figure 1C:
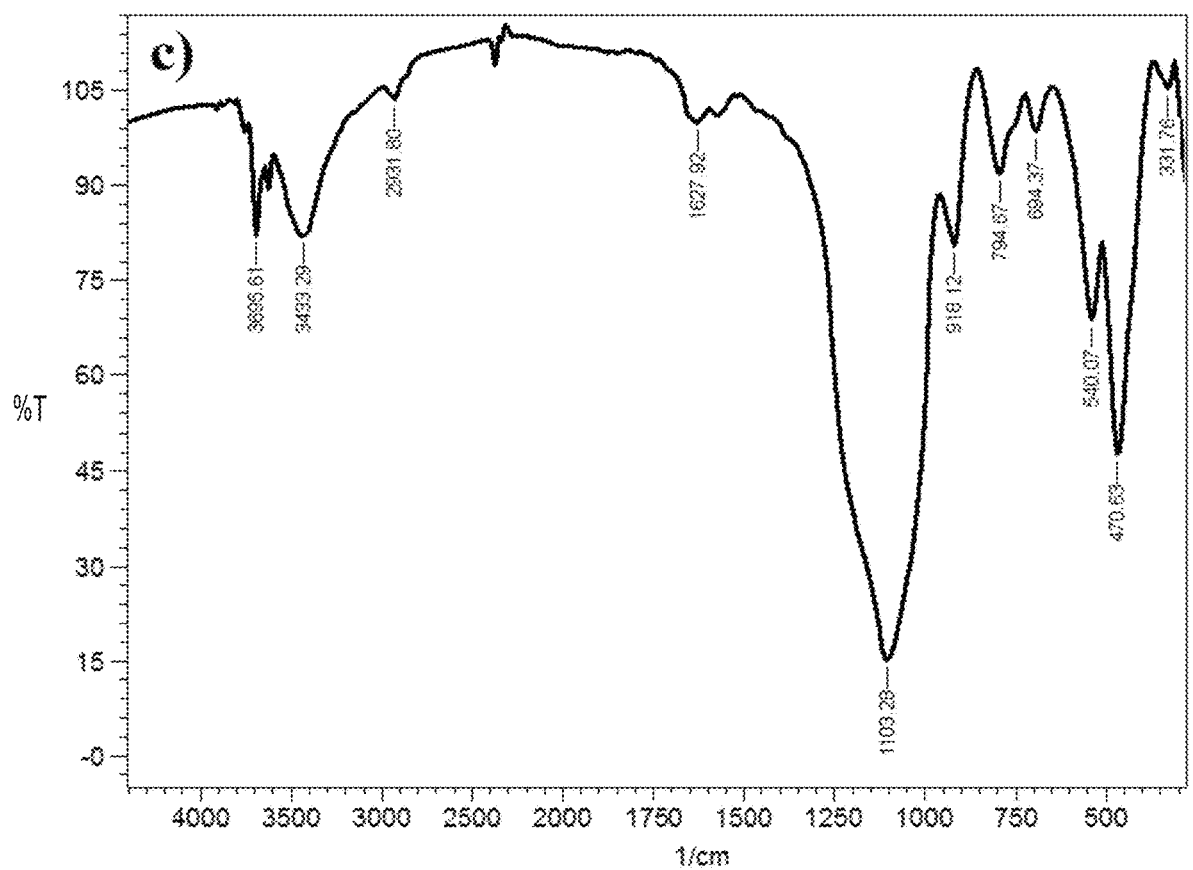

FTIR is a useful technique to confirm the hydroxylation of clay minerals after treatment with typical mixtures concentrated sulfuric acid (98%) to 30% hydrogen peroxide solution are prepared as 3:1 volume % to obtain either HBT or HKT. Amination of HBT or HKT with APTS obtained AHBT and AHKT. The formation of HBT, HKT, AHBT and AHKT was elucidated from their FTIR spectra represented in FIGS. 1 and 2A-B. The disappearance of the broad bands at 3740 and 1639 cm$^{-1}$ represent the stretching and bending vibrations of the OH water molecules in both HBT (FIG. 1A) and HKT (1B) confirms the removal of water bonded among silicate layers. The increasing intensity of a strong band at 3614 cm$^{-1}$ (OH stretching vibration in case of HBT (FIG. 1A) more than HKT (FIG. 2A) elucidates the presence of more hydroxyl groups on the surface of HBT more than HKT. Moreover, the increasing intensity of a new band at 3460 cm$^{-1}$ (N—H stretching) and 1550 cm$^{-1}$ (attributed to N—H in-plane bending vibration) in case of AHBT (FIG. 1B) more than AHKT (FIG. 2B) confirms the increasing of amine contents in case of AHBT more than AHKT. The most intense bands appeared at 1035 cm$^{-1}$ (stretching in the Si—O plane), the vibration at 1113 cm$^{-1}$ represents the stretching out of the Si—O plane and at 445 cm$^{-1}$ (Si—O bending vibration) elucidate the alumina silicate bonds.

Figure 1D:
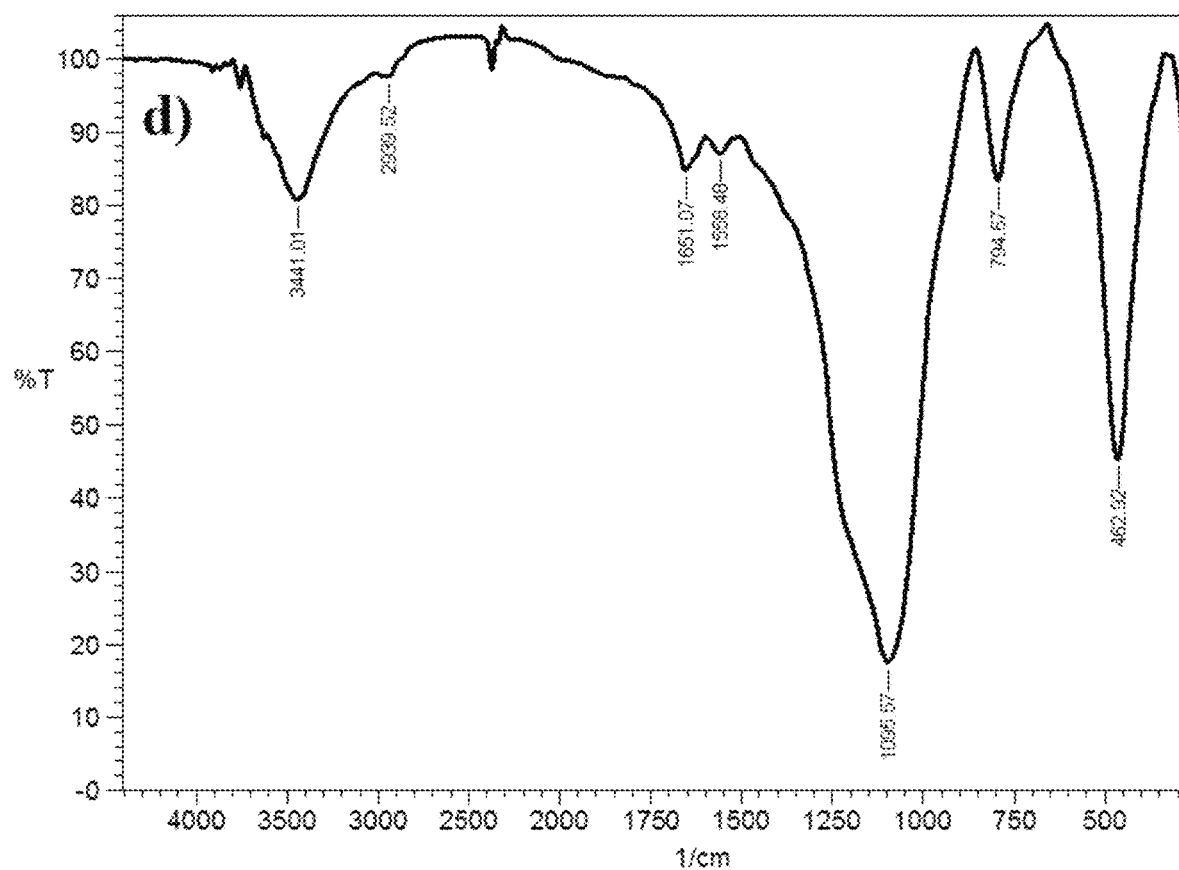
Figure 1E:
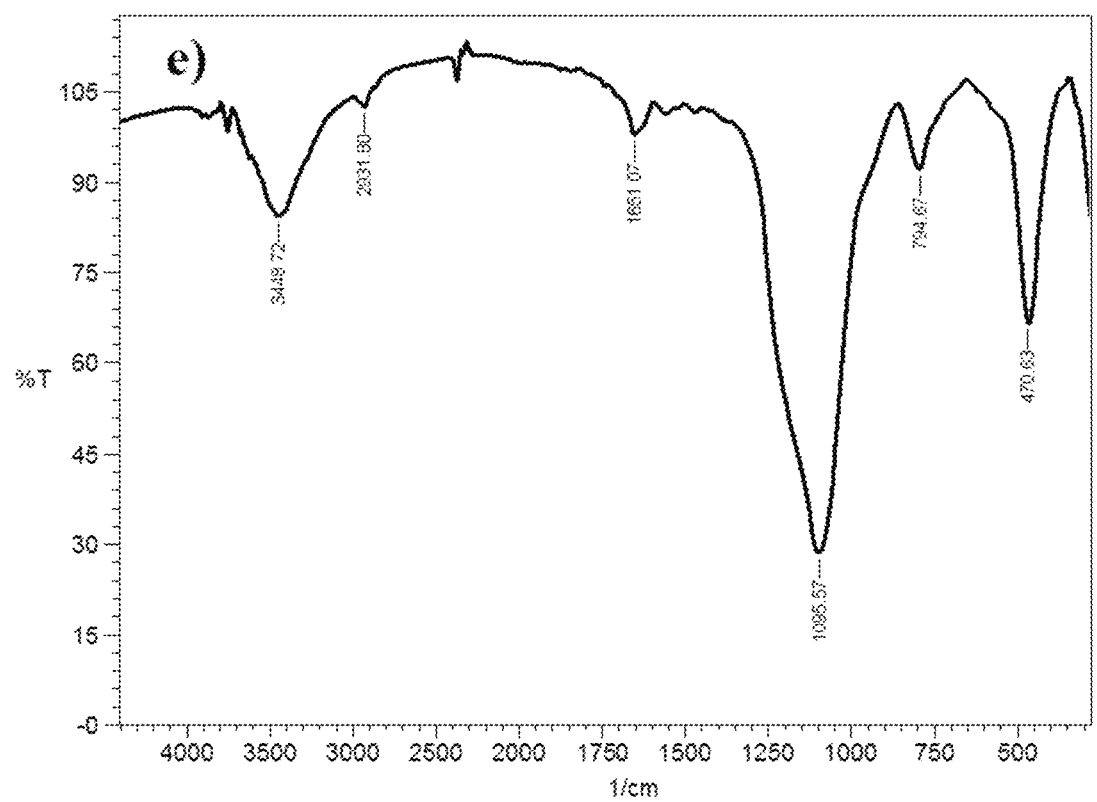
Figure 2A:
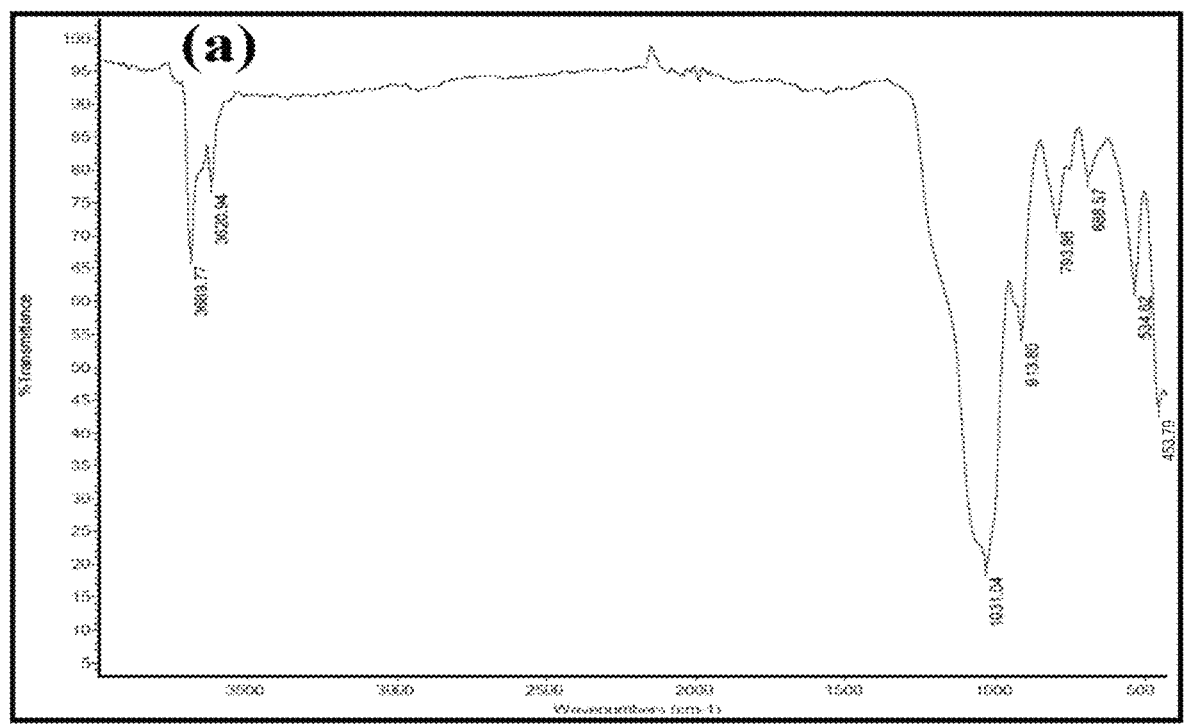
FIGS. 2A-2B show FTIR spectra of A) HBT and B) AHBT.
Figure 2B:
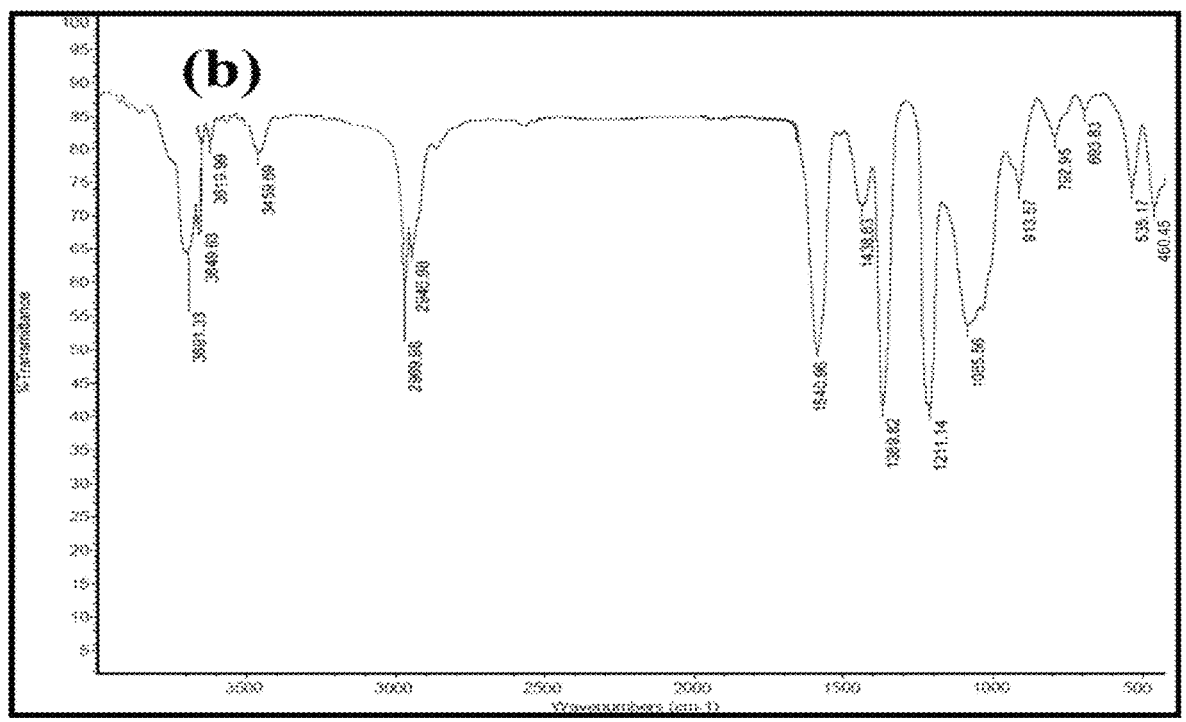
Figure 3A:
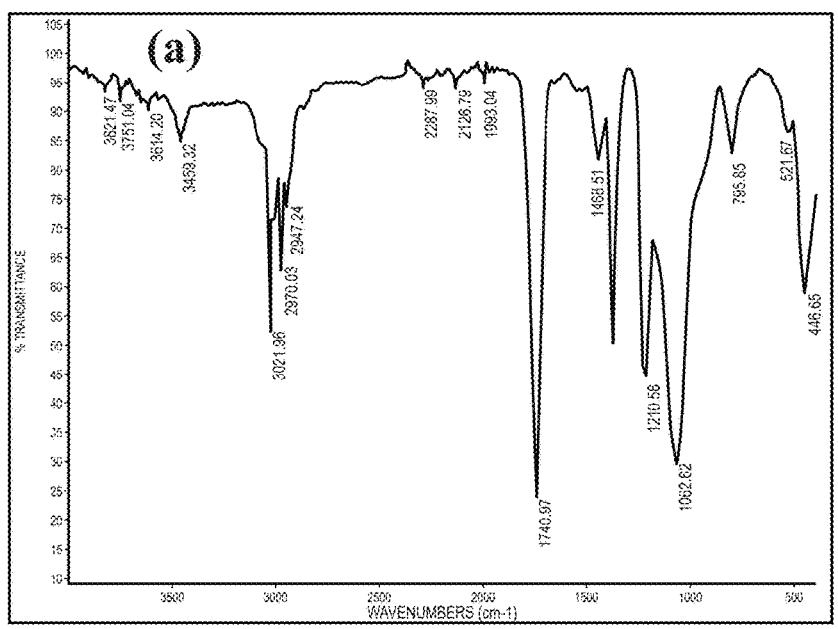
FIGS. 3A-3D show FTIR spectra of A) VHBT, B) PVBT-SBVI, C) PVBT-AMPS-Na and D) PVBT-APTAC.
Figure 3B:
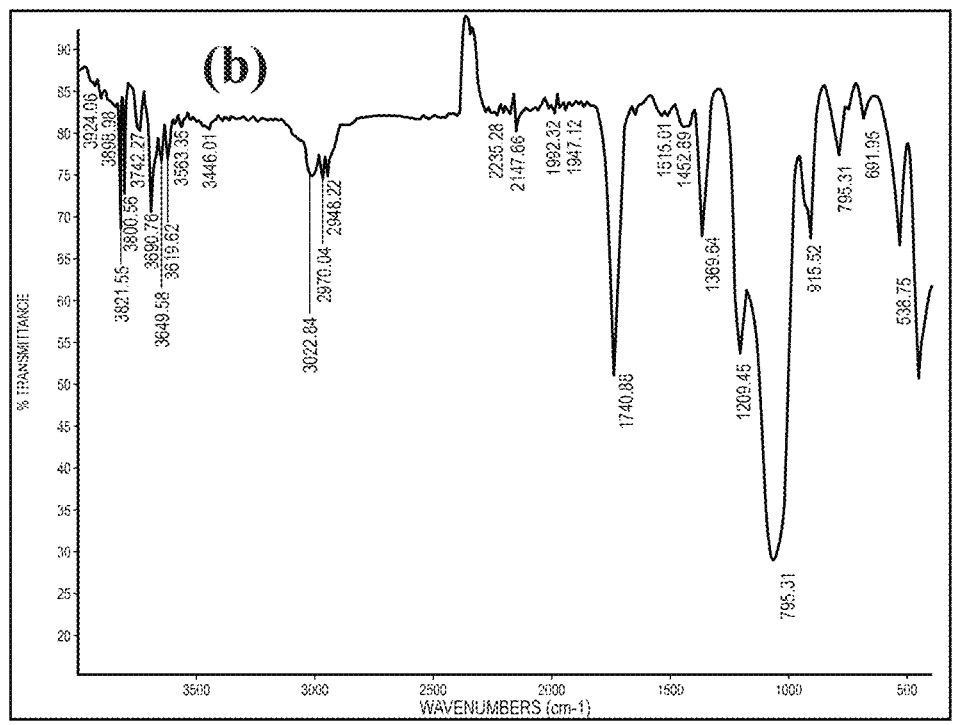
Figure 3C:
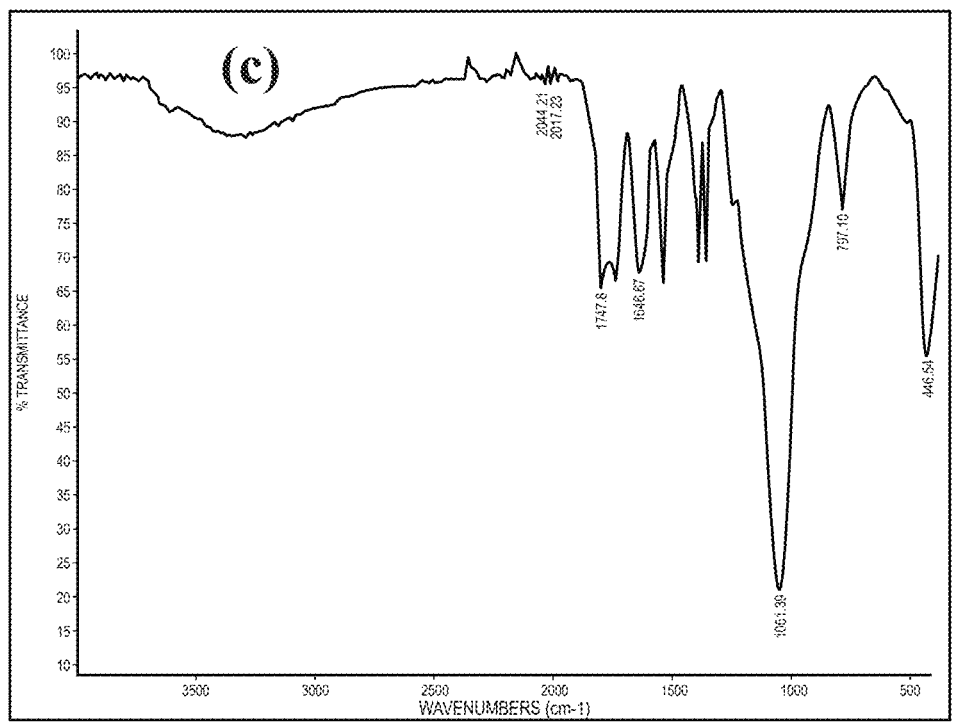
Figure 3D:
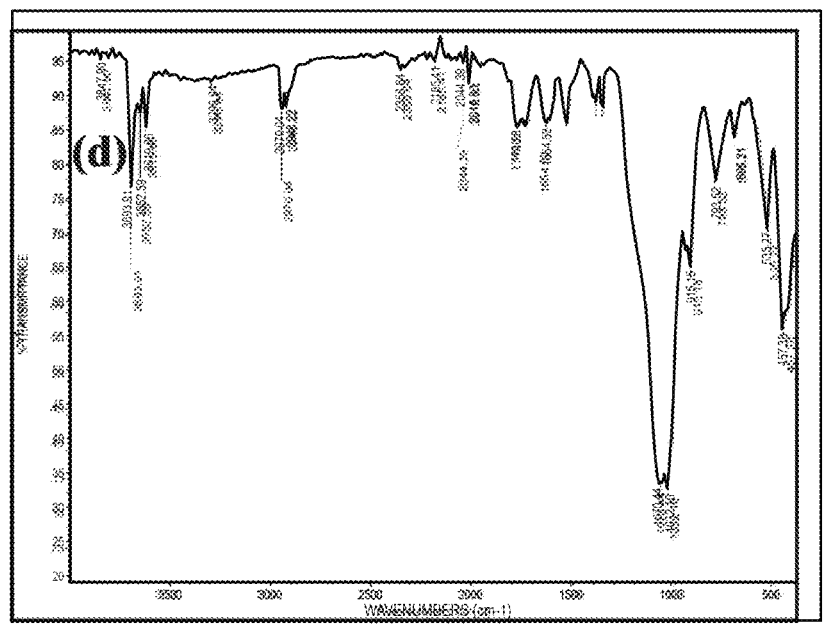

The reaction of SBVI with either AHBT or AHKT can be elucidated from FTIR spectra of either AHBT-SBVI or AHKT-SBVI. In this respect, AHBT-SBVI spectrum was represented in FIG. 1C. The appearance of bands at 3618, 3008, and 1640 cm$^{-1}$ represented N—H stretching, HC=N stretching and C=N stretching vibration confirms the incorporation of imidazolium group on clay mineral surface. The addition of amino groups of either AHBT or AHKT to vinyl group of AMPS-Na and APTAC was confirmed from the disappearance of absorption bands at 3000-3100 cm$^{-1}$, which were assigned=CH stretching vibration (FIGS. 1D and 1E). Moreover, the appearance of bands at 3350 cm$^{-1}$, N—H stretching; 2980, 2930, and 2870 cm$^{-1}$, C—H aliphatic stretching; 1655 cm$^{-1}$, amide-I band assigned to C—O stretching; and 1550 cm$^{-1}$, amide-II band was attributed to N—H in-plane bending vibration indicates the incorporation of AMPS-Na and APTAC with AHBT to form AHBT-AMPS-Na and AHBT-APTAC (as represented in the Scheme 1).

Figure 4A:
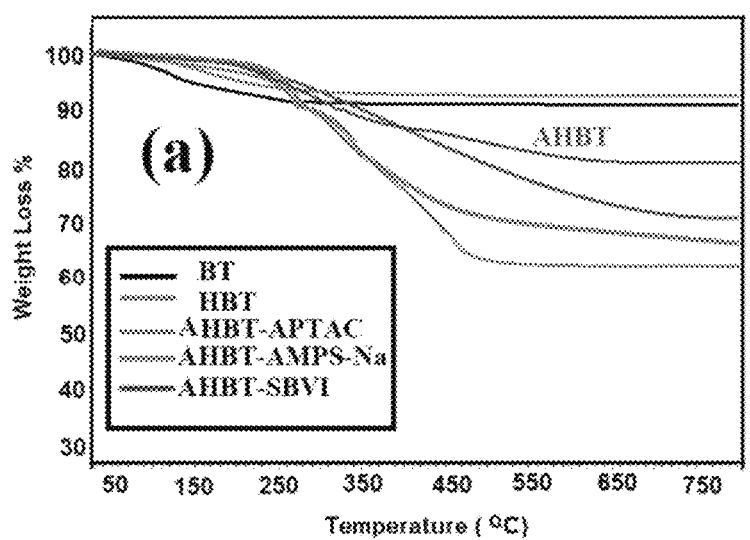
FIGS. 4A-4B shows TGA thermograms of A) HBT and A) HKT derivatives.
Figure 4B:
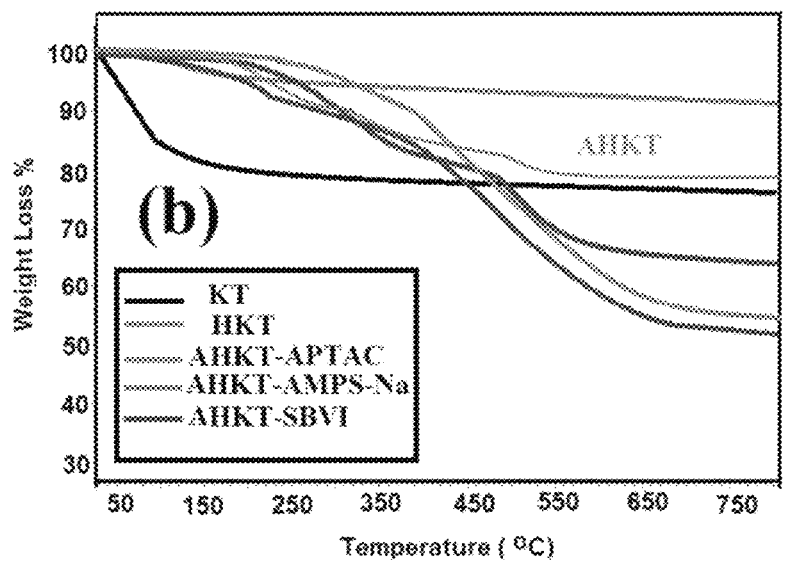

Thermogravimetric analysis (TGA) is commonly used to determine the thermal stability of materials from the initial degradation temperature (IDT; ° C.)) and remained residual after degradation above 650° C. (RS; Wt. %) to determine the amount of organic and polymeric materials on the surfaces of inorganic materials. In this respect, the TGA thermograms of HBT, HKT and their derivatives were selected and represented in FIGS. 4A and 4B. The data confirmed that the hydroxylation of BT and KT reduces the weights at a temperature between 2° and 100° C. (attributed to the water loss that coordinated with aluminum silicate gallery). FIG. 4A elucidates that the wt. % loss below 100° C. was reduced from 8% for BT to 1.1 wt. % for HBT. Moreover, FIG. 4B shows that KT loss, 15 Wt. % below 100° C. which reduced to 2 Wt. % for HKT. It was also noticed that the IDT of AHBT, HBT-AMPS-Na, HBT-SBVI and AHBT-APTAC were 150, 220, 280 and 290° C. (FIG. 4A). It was also noticed that the RS at 750° C. of HBT, AHBT-SBVI, AHBT-APTAC and AHBT-AMPS-Na are 92, 73, 68 and 60 wt. %, respectively. These data mean that the organic content (wt. %) of AHBT-SBVI, AHBT-APTAC and AHBT-AMPS-Na are 19, 24 and 32 wt. %, respectively. These data confirm that the order of grafting or AHBT modification can be arranged as AHBT-AMPS-Na>AHBT-APTAC>AHBT-SBVI. The IDTs (FIG. 4B) of HKT, AHKT, AHKT-AMPS-Na, AHKT-SBVI and AHKT-APTAC are 150, 180, 165, 250, and 300° C. the RS at 750° C. of HBT, AHBT-SBVI, AHBT-APTAC and AHBT-AMPS-Na are 92, 73, 68 and 60 Wt. %, respectively. These data mean that the organic content (wt. %) of AHBT-SBVI, AHBT-APTAC and AHBT-AMPS-Na are 19, 24 and 32 wt. %, respectively. Careful inspection of TGA data represented in FIG. 4B elucidate that the RS at 750° C. of AHKT, AHBT-SBVI, AHKT-APTAC and AHKT-AMPS-Na are 83, 65, 58 and 48 wt. %, respectively. These data mean that the organic content (wt. %) of AHKT-SBVI, AHKT-APTAC and AHKT-AMPS-Na are 18, 25 and 35 wt. %, respectively. These data indicated that the AMPS-Na has strong ability to bond with amine groups of either AHBT or AHKT. It is proposed that AMPS-Na forms strong hydrogen bonds with the hydroxyl groups of AHBT and AHKT galleries.

Figure 5A:
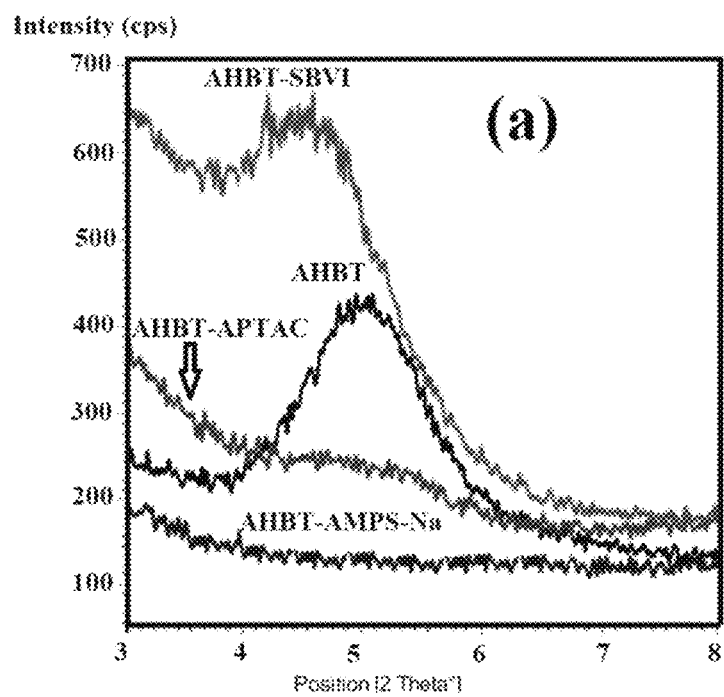
FIGS. 5A-5B show WAXD diffractograms of A) AHBT and B) VHBT derivatives.
Figure 5B:
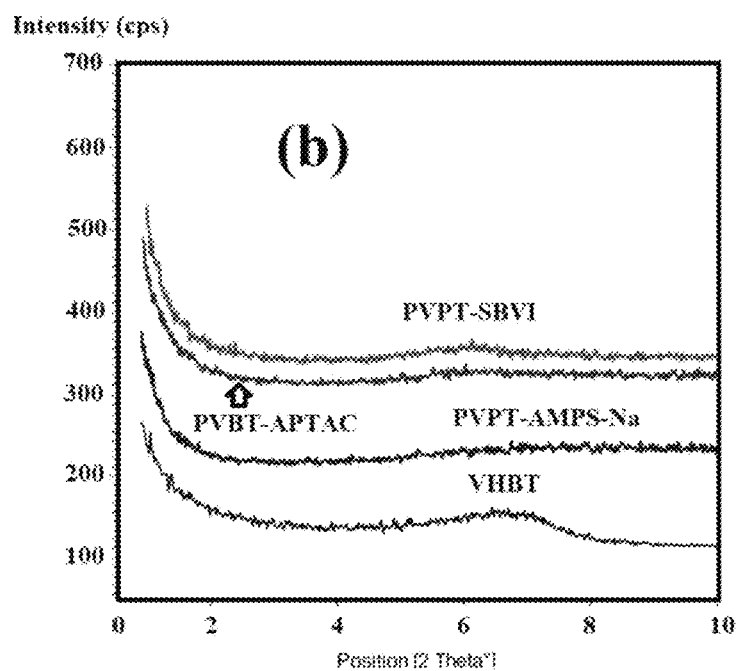
Figure 6A:
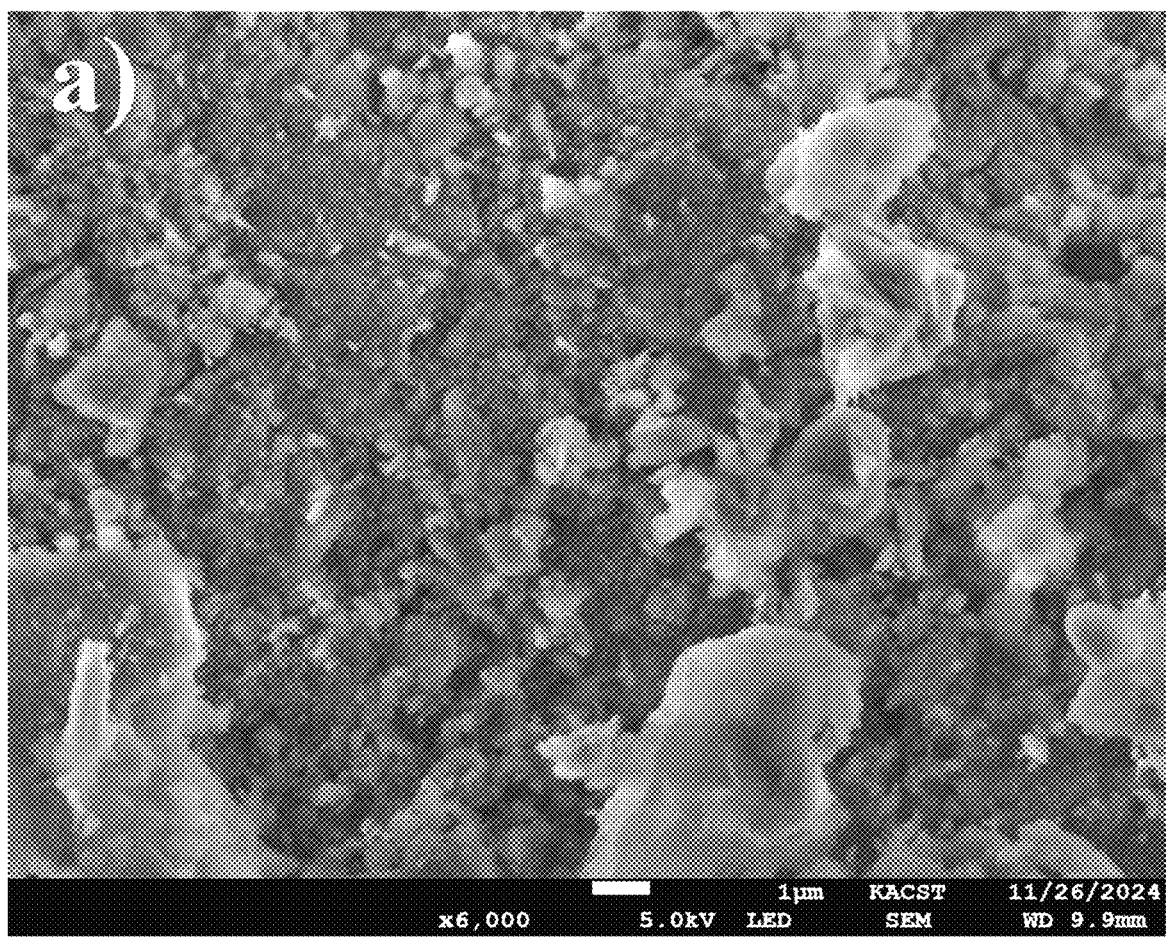
FIGS. 6A-6E show SEM micrographs of A) HBT, B) AHBT, C) AHBT-SBVI, D) AHBT-APTAC and E) AHBT-AMPS-Na.
Figure 6B:
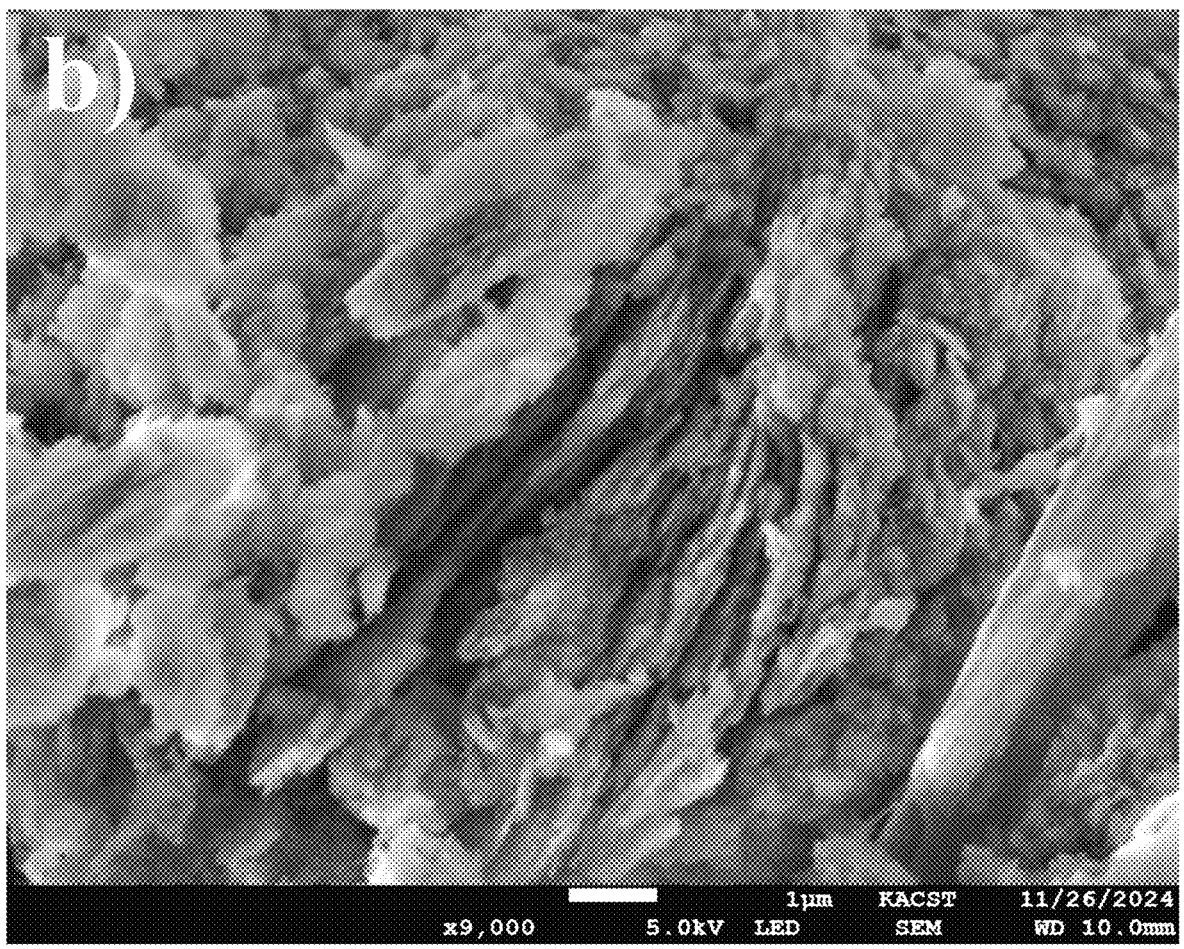
Figure 6C:
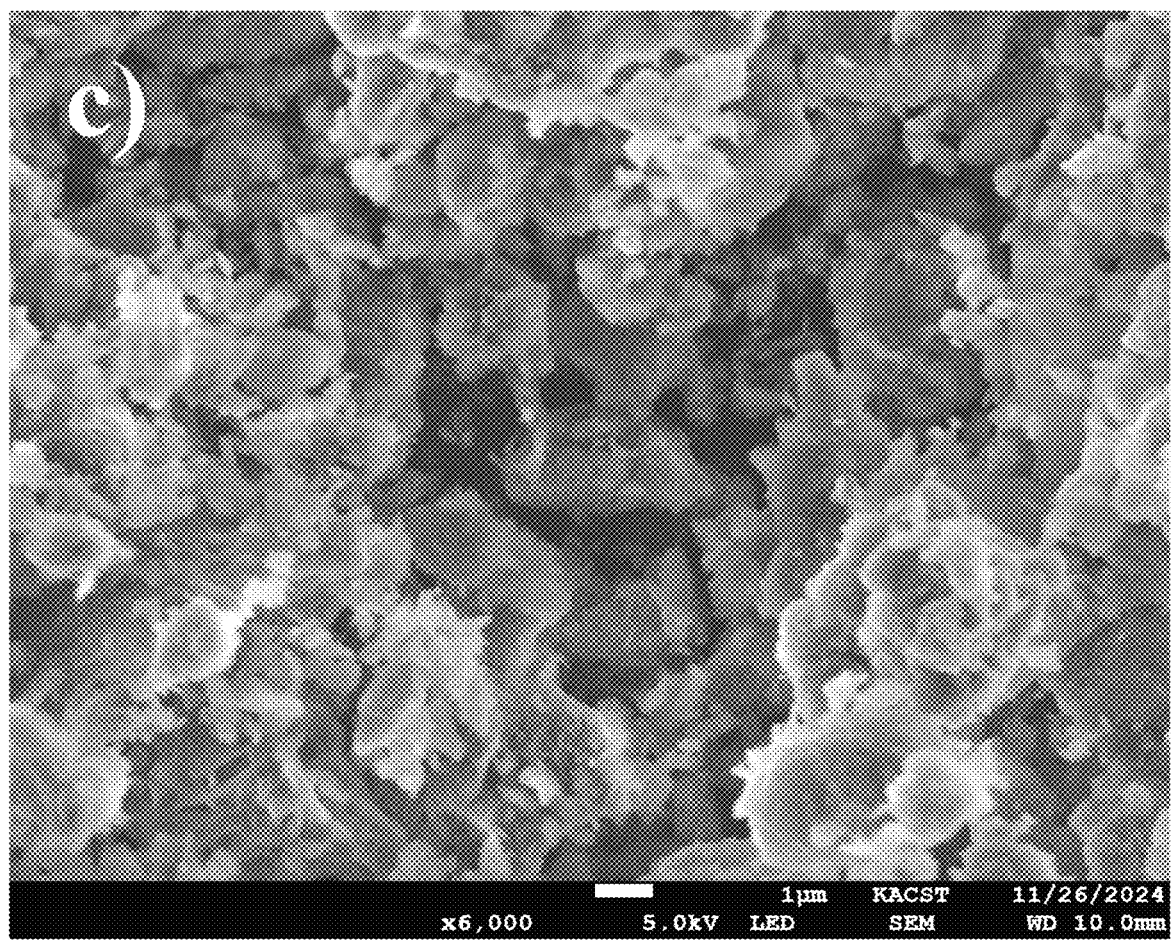
Figure 6D:
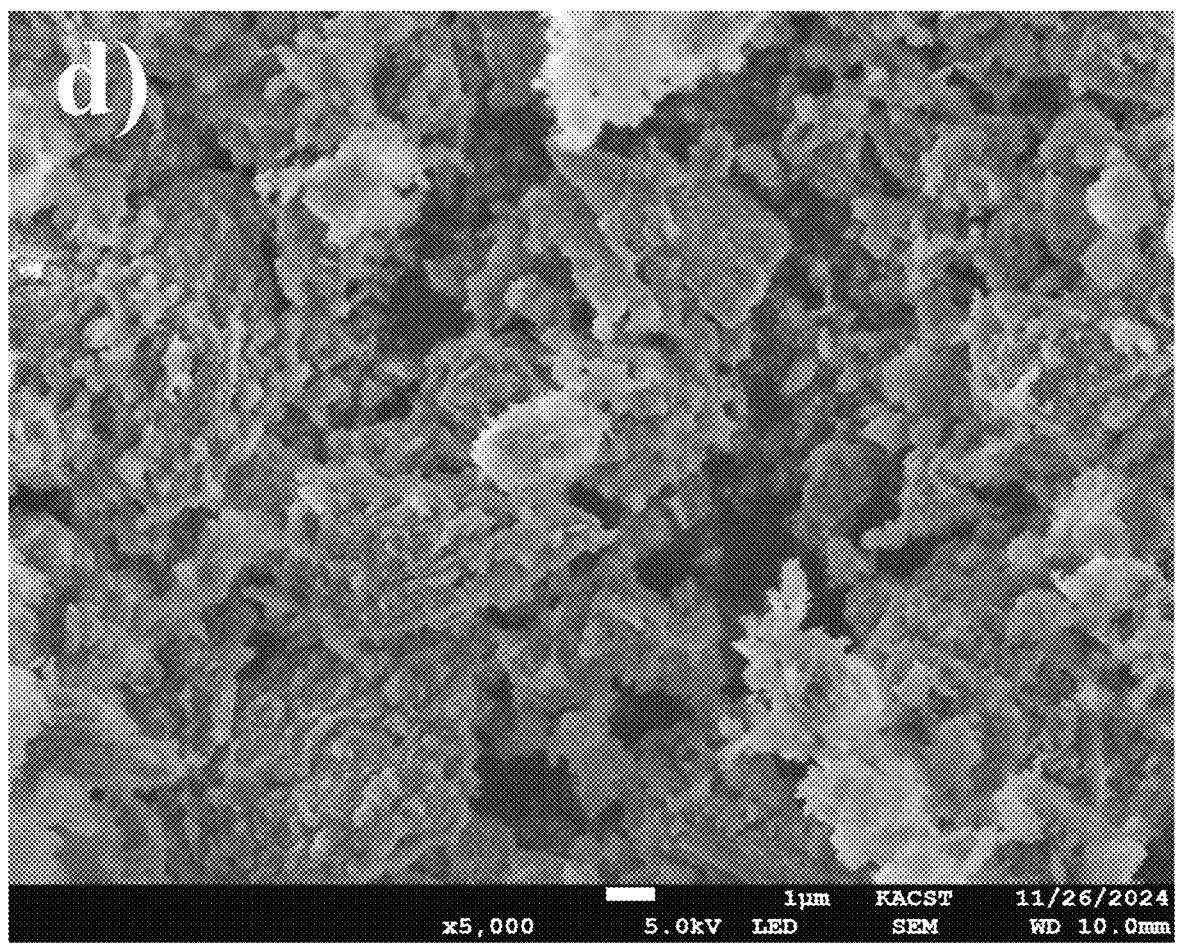
Figure 6E:
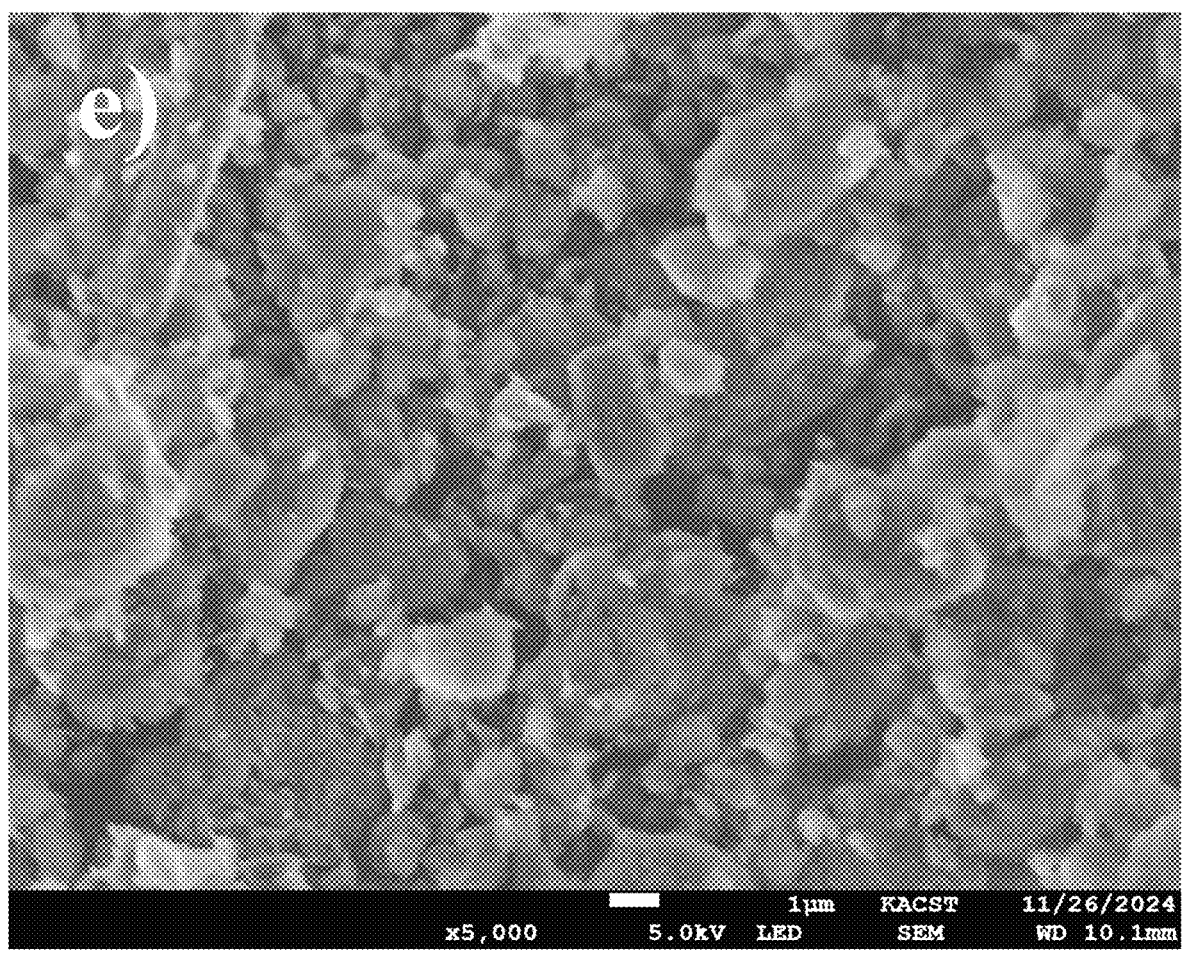
Figure 7A:
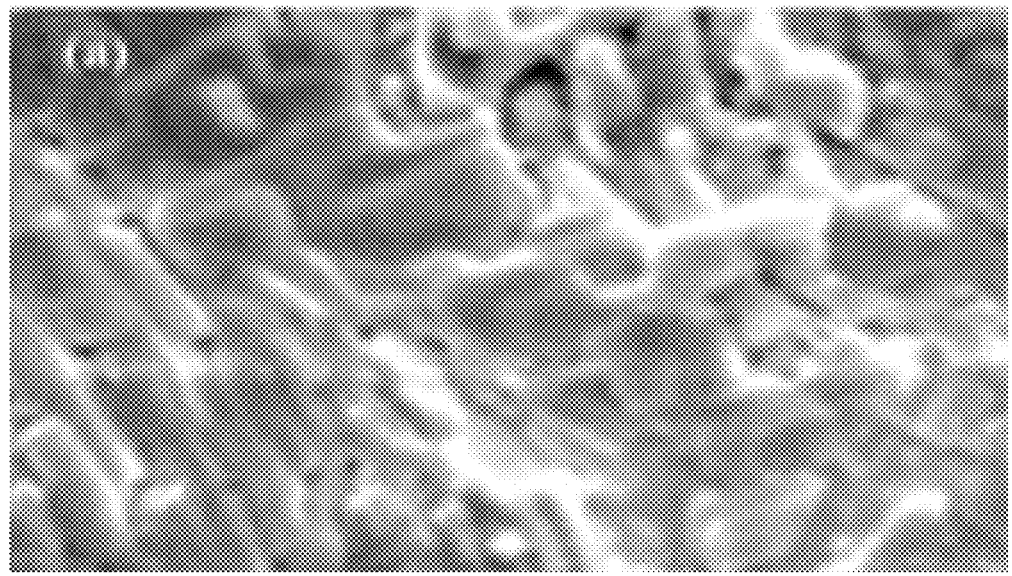
FIGS. 7A-7E shows SEM micrographs of A) HKT, B) AHKT, C) AHBT-SKVI, D) AHKT-APTAC and E) AHKT-AMPS-Na.
Figure 7B:
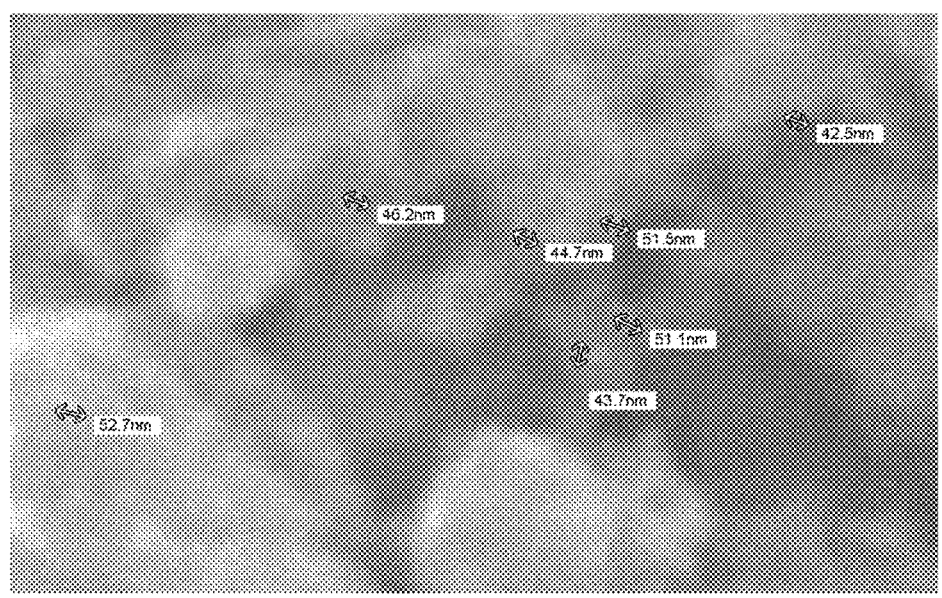
Figure 7C:
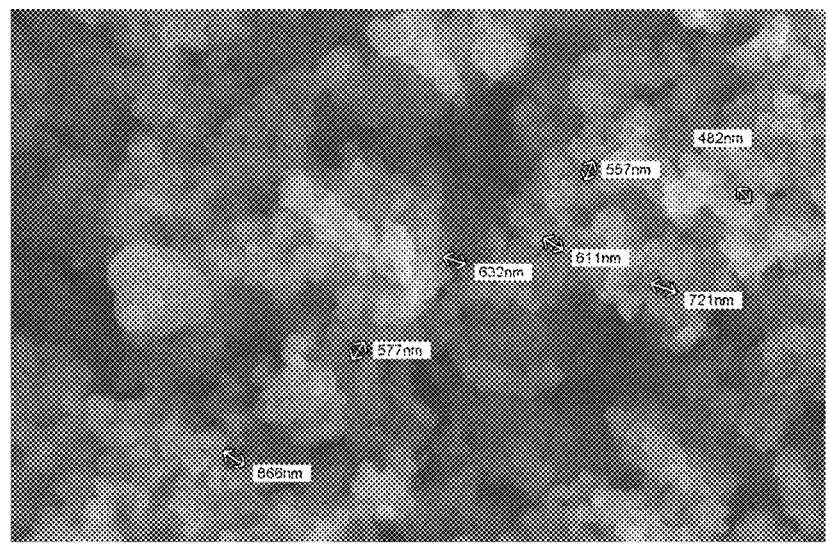
Figure 7D:
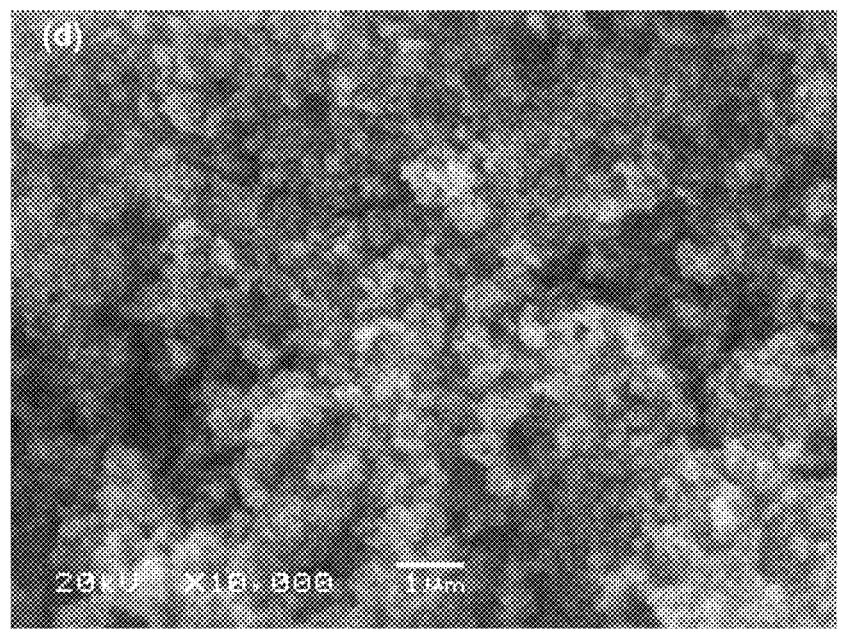
Figure 7E:
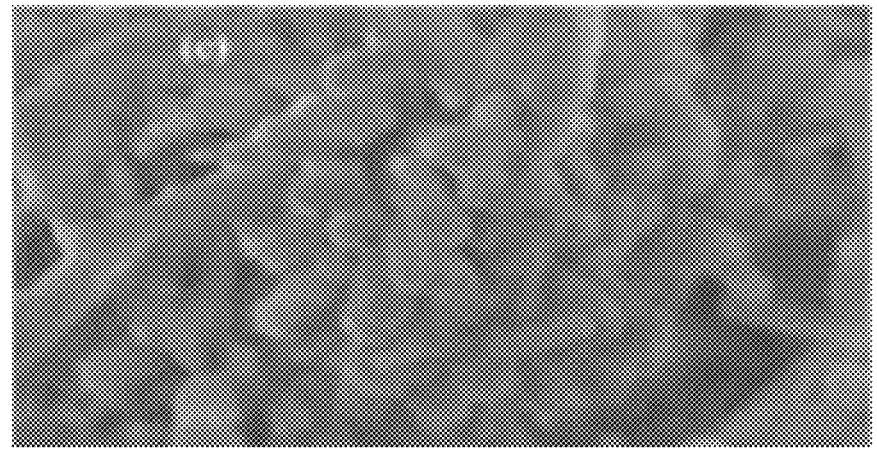

It was necessary to determine the effect of modification on the crystal structure and spacing of BT and KT sheets that can be confirmed using wide-angle x-ray diffraction (WAXD). The low-angle peaks in WAXD determine the quantitative changes in layer spacing. The analysis is based on monitoring the intensity, position, shape, and the basal reflections from the distributed silicate layers that can confirms the intercalation or exfoliation of silicate layers. The WAXD patterns of HBT and VHBT with and without modification are represented in FIGS. 5A and 5B). Unmodified HBT and VHBT shows a peak at about 2-theta 5.60 and 6.50° that referred to (d001-reflection). This peak was shifted to 4.6° when AHBT reacted with SBVI (FIG. 5A) to confirm its intercalation with silicate galleries. The intensity of this peak was reduced with AHBT-APTAC to confirm both intercalation and partial exfoliation of clay galleries. The AHBT-AMPS-Na (FIG. 5A) shows no peak to confirm the exfoliation of silicate layers. While VHBT was completely exfoliated when polymerized with APTAC and AMPS-Na and slightly low peak at 2-theta 4.9° indicating that the SBVI intercalated and did not completely exfoliate VHBT (FIG. 4B). This was attributed to the Van-der Waals force interaction between VBT galleries.

Figure 8A:
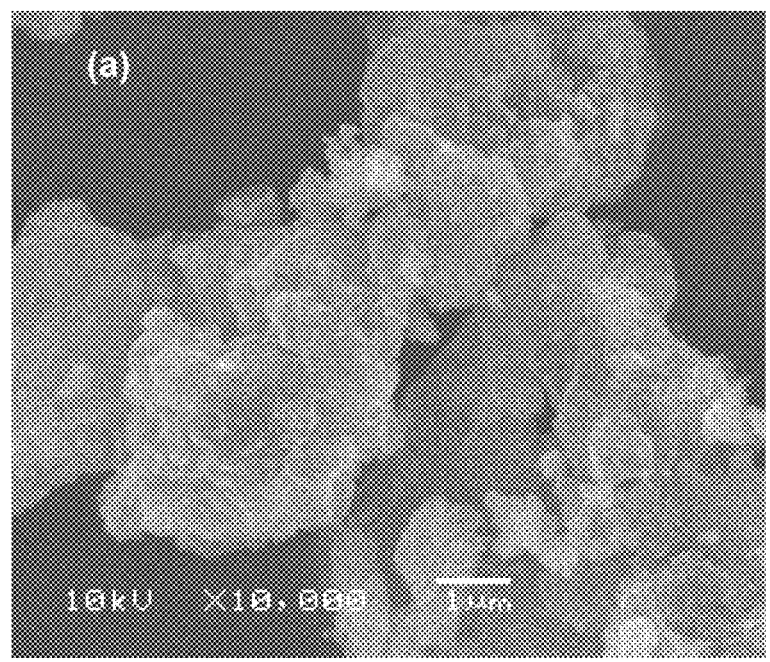
FIGS. 8A-8D show SEM micrographs of A) VHBT, B) PVBT-SBVI, C) PVBT-AMPS-Na and D) PVBT-APTAC.
Figure 8B:
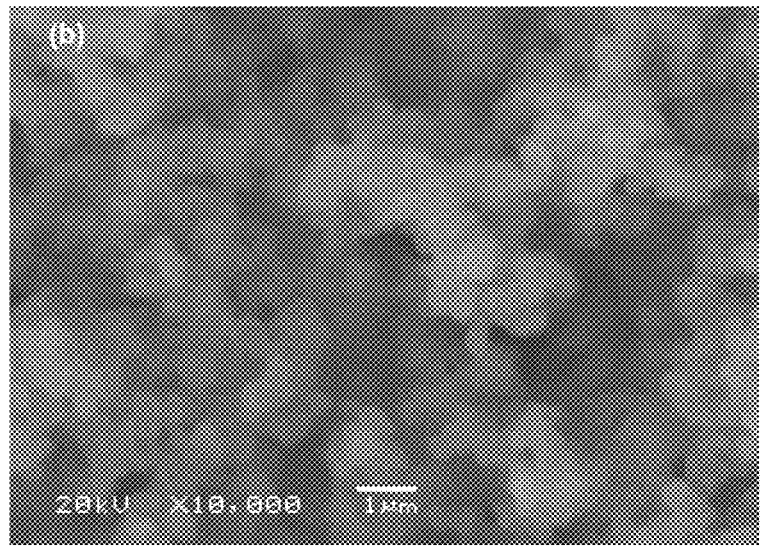
Figure 8C:
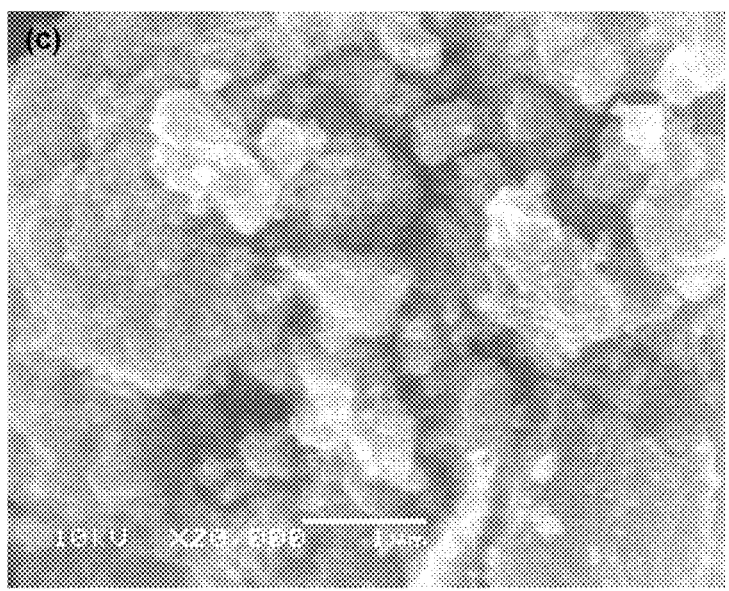
Figure 8D:
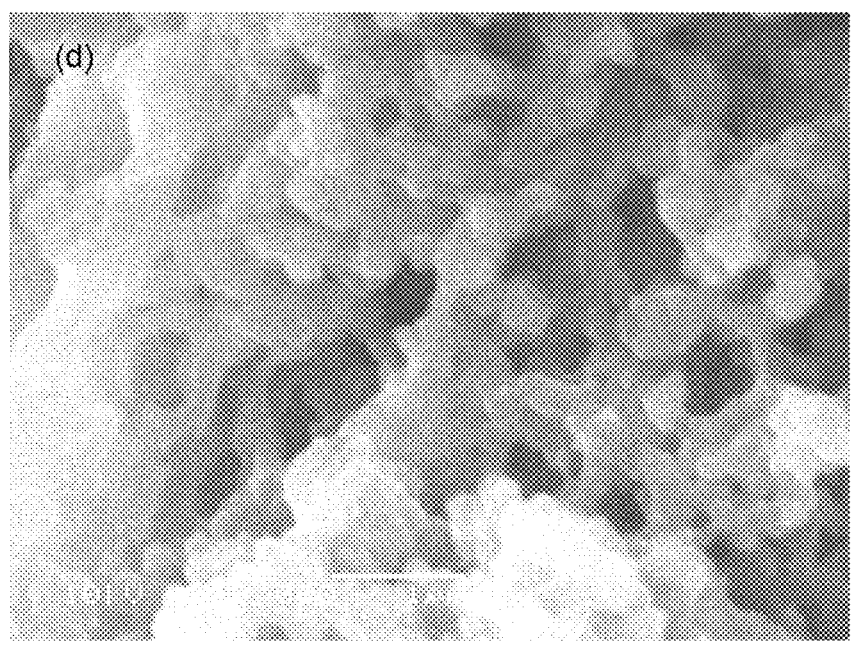
Figure 9A:
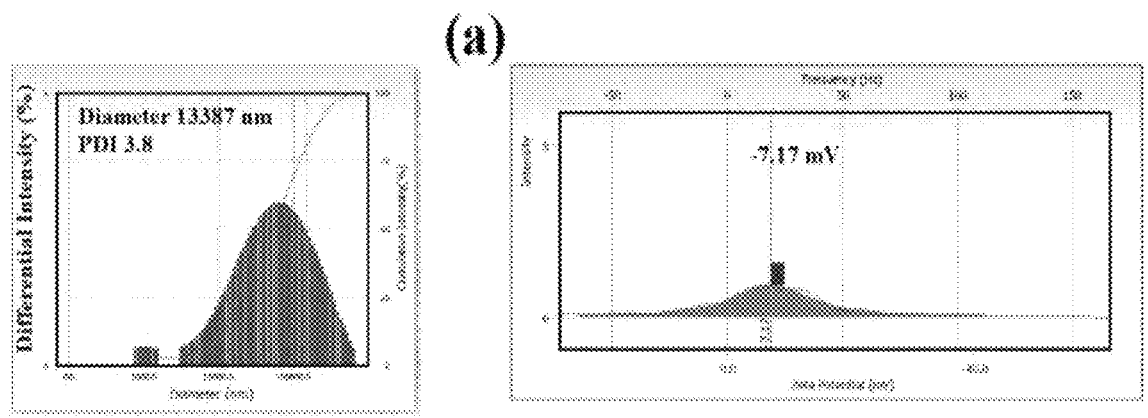
FIGS. 9A-9E show graphs DLS data particle sizes in seawater (on the left) and zeta potential in distilled water (on the right) (in the presence of 0.1001 M KCl) of A) HBT, B) AHBT, C) AHBT-SBVI, D) AHBT-AMPS-Na and E) AHBT-APTAC.
Figure 9B:
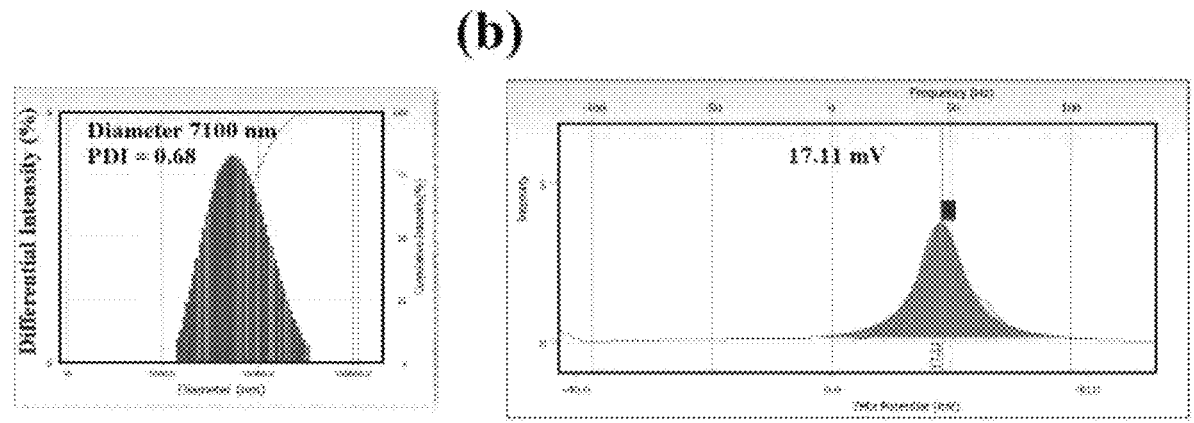
Figure 9C:
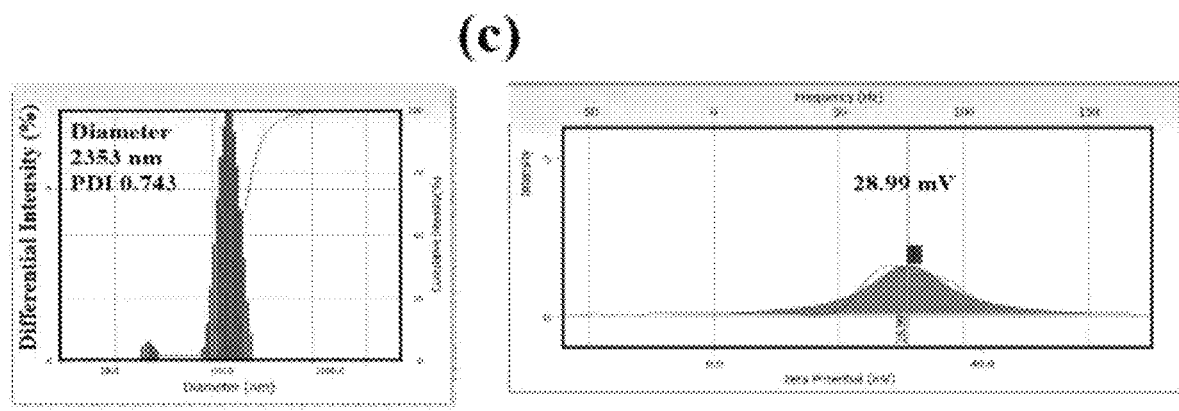
Figure 9D:
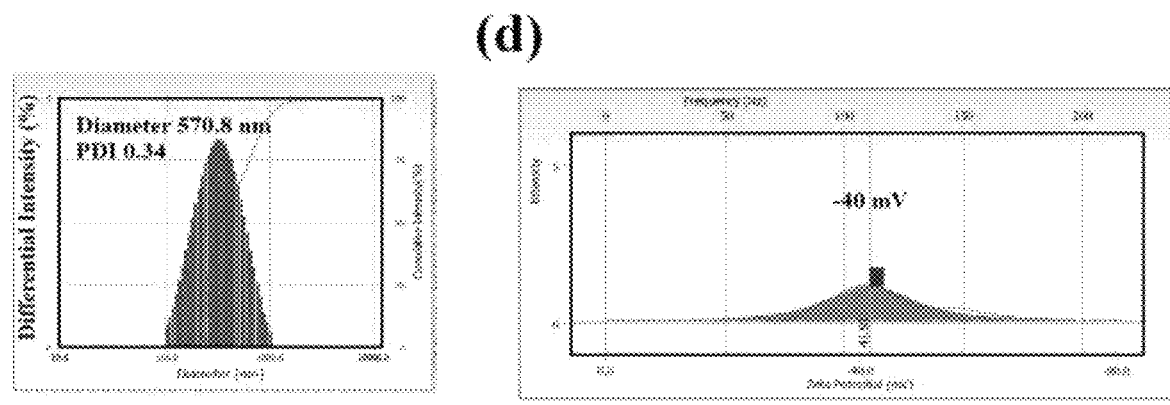
Figure 9E:
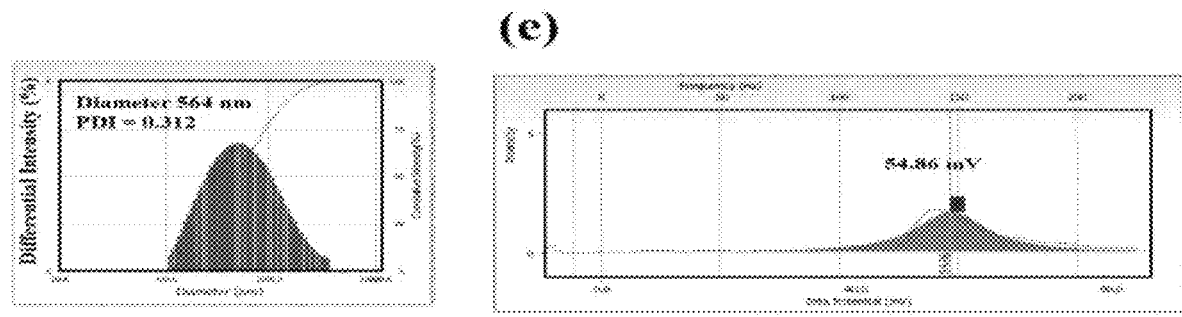
Figure 10A:
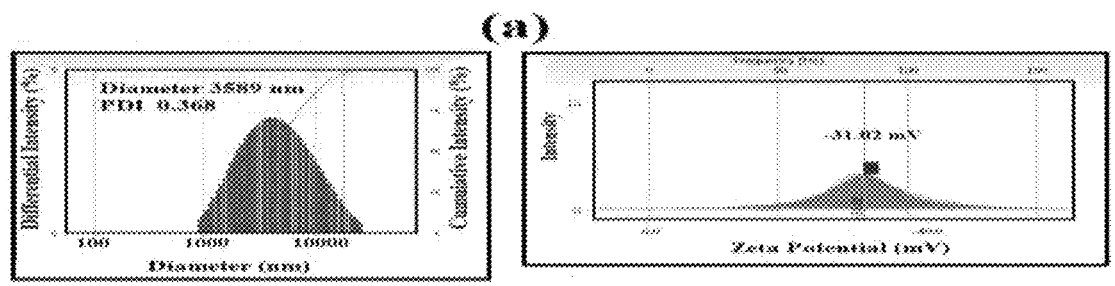
FIGS. 10A-10E show graphs of DLS data particle sizes in seawater (left) and zeta potential in distilled water (right) (in the presence of 0.1001 M KCl) of A) HKT, B) AHKT, C) AHKT-SBVI, D) AHKT-AMPS-Na and E) AHKT-APTAC.
Figure 10B:
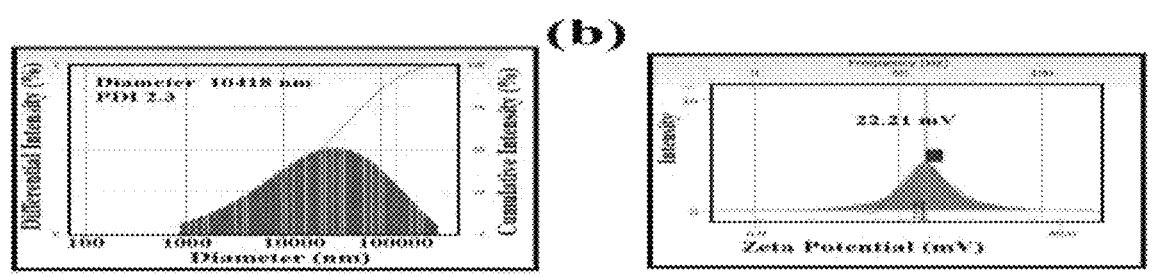
Figure 10C:
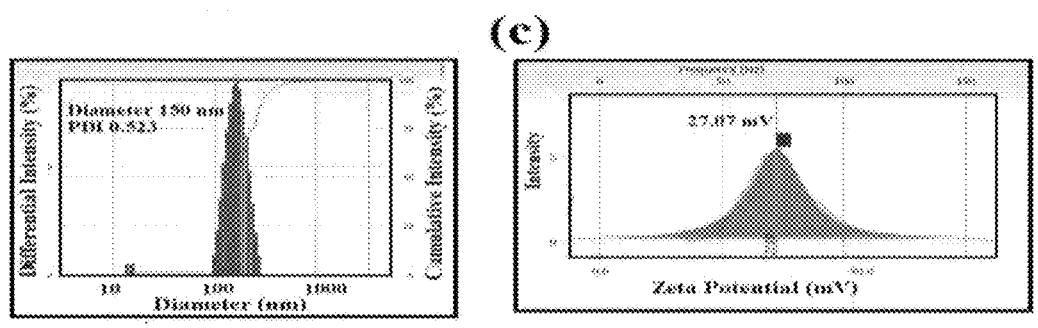
Figure 10D:
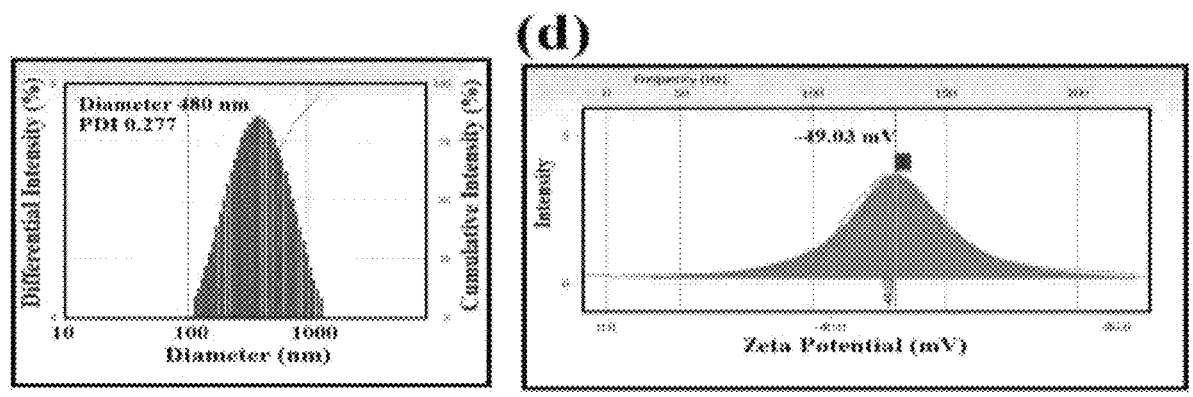
Figure 10E:
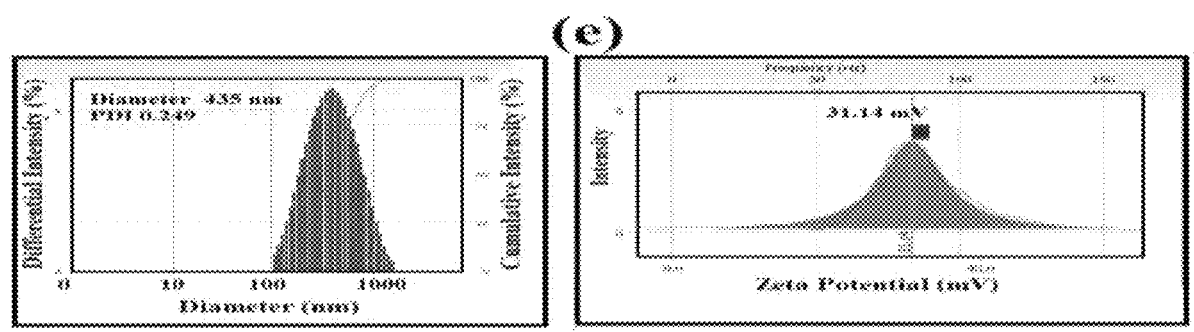

The morphology of AHBT, AHKT and VHBT and their derivatives can be examined from their SEM micrographs summarized in FIGS. 6, 7A-7E and 8A-8D, respectively. SEM micrographs clearly illustrated the dependence of morphology on the types and contents of organic structures. The micrographs of HBT, HKT and VHPT (FIGS. 6-8A) confirm that they are forming micron-sized agglomerates that are composed of individual platelets, which conglomerate into large size particles. It was observed that AHBT-SBVI, AHBT-APTAC and AHBT-AMPS-Na (FIGS. 6C-6E) display more exfoliated layers, open and porous channel structure than AHBT. The AHBT-SBVI and AHBT-APTAC micrographs (FIGS. 6C and 6D) show a rough honeycomb, and cellular arrangement. Moreover, the HKT and AHKT are nearly always of the well crystallized variety, often occurring in booklets and vermicules, and as discrete aggregates rather than as pore-lining or pore-bridging clays and their textural are authigenic. Their modifications AHKT-SBVI, AHKT-APTAC and AHKT-AMPS-Na (FIGS. 7C-7D) show spherical and plate nanosized particles without formation of cellular arrangement. These observations were also observed in the morphologies of PVBT-SBVI, PVBT-AMPS-Na and PVBT-APTAC (FIGS. 8C-8D). These data confirm that the morphologies of PVBT and AHKT are more suitable to apply in the field of drilling fluids than that obtained with AHBT having cellular structure that hydrated and swell their particles.

Example 5

Dispersion of Clay Minerals in Seawater

Figure 11A:
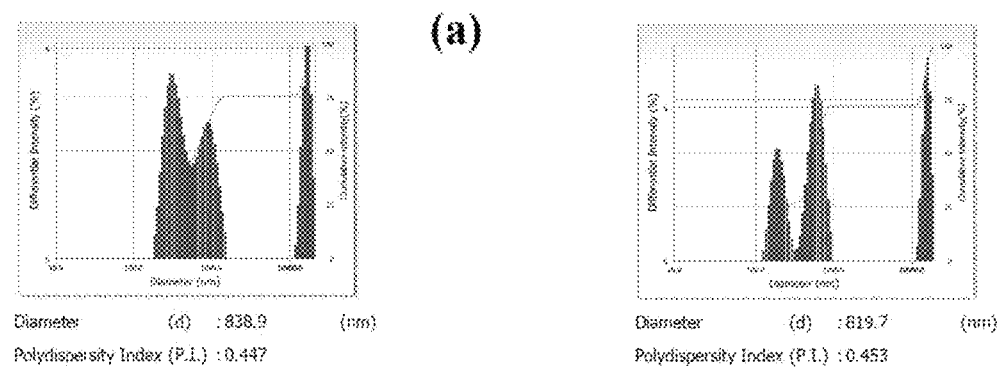
FIGS. 11A-11C DLS data particle sizes in seawater of a) PVBT-SBVI (left) and PVKT-SBVI (right), b) PVBT-AMPS-Na (left) and PVKT-AMPS-Na (right) and c) PVBT-APTAC (left) and PVKT-APTAC (right).
Figure 11B:
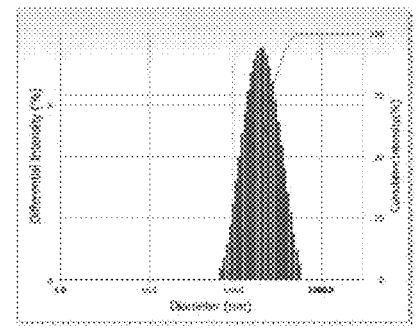
Figure 11B:
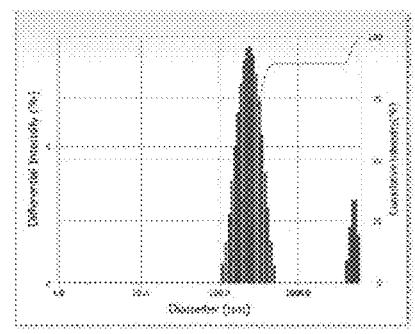
Figure 11C:
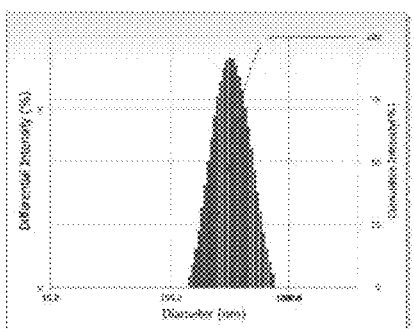
Figure 11C:
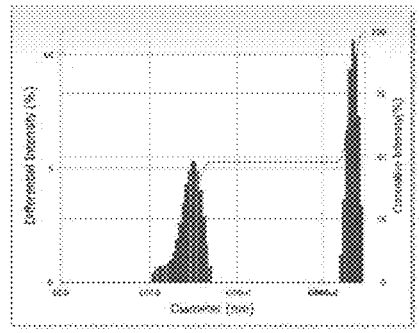
Figure 12:
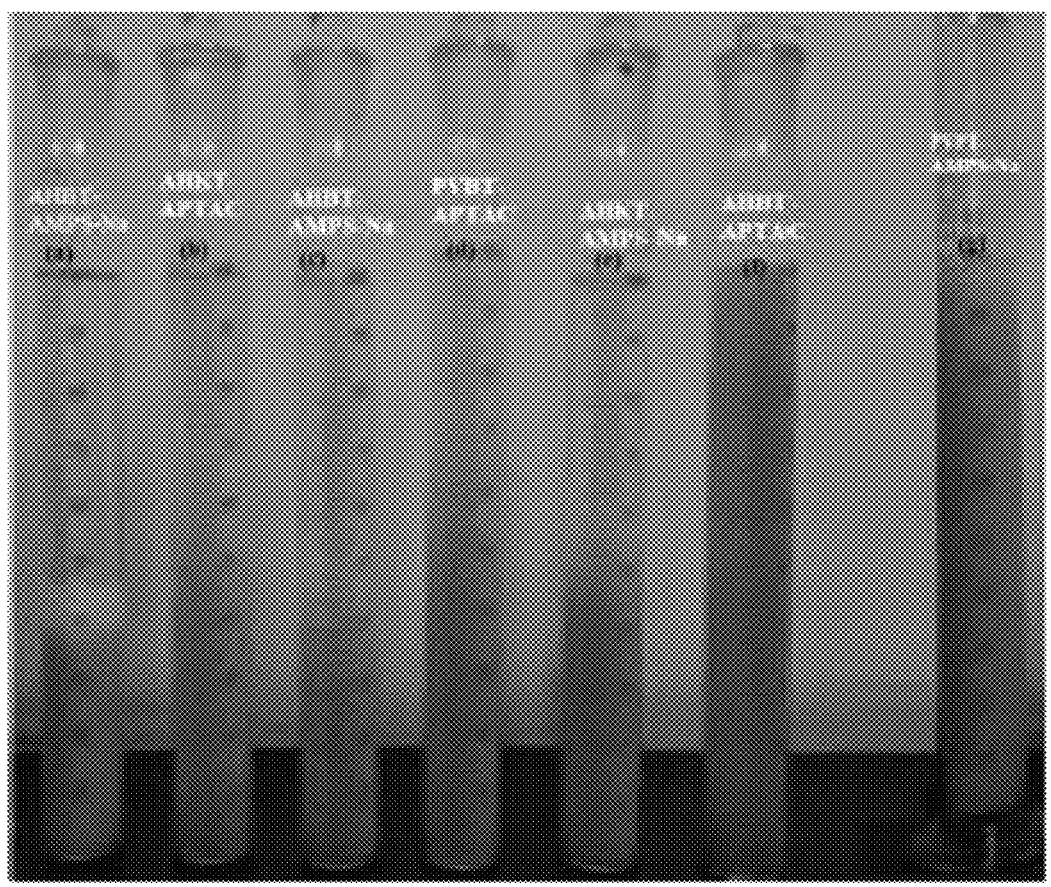
FIG. 12 shows derivatives suspensions of AHBT, AHKT, and PVHT to illustrate the stability of selected clay mineral dispersions using 6.5 Wt. % in 100 mL seawater.

The dispersion of clay minerals (BT and KT), modifications (HBT, HKT, AHBT, AHKT, VHBT and VHKT) and their derivatives in the seawater from their DLS measurements was investigated and summarized in FIGS. 9, 10 A-E and FIGS. 11A-C. It is well established that the colloidal suspensions and dispersions having zeta potentials above positive or negative 20 mV, lower particle sizes and polydispersity index (PDI) below 0.7 form stable dispersion and suspension in aqueous medium.

The DLS data of HBT (FIGS. 9A-9E) prove that AHBT-AMPS-Na and AHBT-APTAC form stable dispersion and suspension in seawater. While DLS data of HKT (FIGS. 10A-10E) confirm that the AHKT-AMPS-Na produces stable dispersion and suspension in seawater. The DLS data of PVBT and PVKT (FIGS. 11A-11C) confirm that PVBT-AMPS-Na and PVBT-APTAC form stable dispersions in the seawater. These data prove that the AMPS-Na and APTAC grafts increase the dispersion of either AHBT or PVBT in seawater than that occurred with zwitterion SBVI.

The stability of the selected clay mineral dispersions using 6.5 Wt. % in 100 mL seawater was examined after dispersions for 30 days were represented in FIGS. 12A-12G. As shown in FIG. 12, a stable suspension was formed with PVBT-AMPS-Na and AHBT-APTAC.

Example 6

Filter Loss and Rheology and Characteristics of Modified Clay Minerals

One of the key properties of drilling fluids is the lower filtration rate because higher filtration levels increase the thickness of the fluid, leading to operational problems like pipe sticking and high torque and drag. In this respect, the measured filtrate losses were measured for the selected AHBT, AHKT, and PVHT derivatives suspensions and represented in Table 1, below. It was noticed that the API filter lose (API-FL) shows a significant reduction in filtrate loss under the API conditions in the order PVBT-AMPS-Na>AHKT-APTAC>AHBT-APTAC>PVBT-APTAC>AHKT-AMPS-Na>AHBT-AMPS-Na>AHBT-SBVI. The rheological characteristics for the selected AHBT, AHKT, and PVHT derivatives suspensions and represented in Table 1. The lower YP (Pa) of PVBT-AMPS-Na and AHKT-AMPS-Na than PV (cP) confirm that these fluids will not require extra pressure to pump and circulate. Also, there were no traces of aggregates in these mud systems indicating that they are well dispersed and soluble in the mud.

TABLE 1

Filter loss and rheology and characteristics of modified clay minerals

| Clay Minerals | API-FL (mL) | AV (cP) | PV (cP) | YP (Pa) |
|---|---|---|---|---|
| AHBT-AMPS-Na | 10.5 | 23 | 12 | 22 |
| AHBT-APTAC | 6.5 | 77 | 41 | 73 |
| AHBT-SBVI | 13.3 | 21 | 11 | 20 |
| AHKT-APTAC | 4.8 | 50 | 27 | 25 |
| AHKT-APTAC | 4.8 | 50 | 27 | 25 |
| PVBT-APTAC | 7.2 | 71 | 52 | 38 |
| PVBT-AMPA-Na | 2.3 | 100 | 57 | 40 |

Example 7

Drilling Mud Test

The effect of the modified clay contents (3-10 Wt. %) on the seawater (100 mL) viscosity was measured from the rheological properties. The apparent viscosity, plastic viscosity, and yield point were calculated from 600 to 300 rpm dial readings (recorded by Fan Model 35 Viscometer) using the following formula according to the API recommended practice of standard procedure for field testing drilling fluids (API RP 13B-1 2017 Recommended Practice Standard Procedure for Field Testing Water based) Drilling Fluids.).

Apparent viscosity (AV; cp)=$\varphi 600/2$

Plastic viscosity (PV; cp)=$\varphi 600$-$\varphi 300$

Yield point (YP; pa)=$\varphi 300$-AV

The viscometer was initially operated at 600 rpm for 10 s, and then followed by a subsequent 10 min shut off. The maximum reading attained after starting rotation at 3 rpm is the 10-min gel strength in pound per 100 square feet. For the sake of consistency, gel strength was expressed in Pascal (pa).

Example 8

Filtration Test

API filter loss could be considered as an acceptable method to evaluate the potential of a product to prevent clay swelling. In this respect, modified clay (8 mass %) was added to seawater to produce their dispersions and were subsequently hot rolled at 82° C. for 16 h. Finally, the amounts of filtration were measured using multiple filter press stages at 78° F. and 100 psi pressure after a continuous 30-min test period (according to the API recommended practice of standard procedure for field testing drilling fluids; API RP 13B-1 2017).

It is to be understood that embodiments of the method for preparing a clay-polymer composite to increase function in industrial applications as described herein are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of preparing a clay-polymer composite, the method comprising:
   hydroxylating natural clay by
      mixing an amount of clay with a hydrochloride and hydrogen nitrate mixture to obtain a first reaction mixture,
      stirring the first reaction mixture to obtain a powder,
      treating the powder with a piranha solution to obtain a second reaction mixture; and
      stirring the second reaction mixture to obtain hydroxyl terminated clay; and
   polymerizing the hydroxylated natural clay with a monomer selected from the group consisting of 1-(4-sulfobutyl)-3-vinyl-1H-imidazole-3-ium butane-1-sulfonate (SBVI), acrylamidopropyl trimethylammonium chloride (APTAC), and 2-acrylamide-2-methylpropane sodium sulfate (AMPS-Na).

2. The method of claim 1, wherein polymerizing the hydroxylated clay comprises:
   aminating the hydroxylated clay; and
   polymerizing the aminated hydroxylated clay to provide the clay-polymer composite.

3. The method of claim 2, wherein aminating the hydroxylated clay comprises mixing the hydroxyl terminated clay with 3-aminopropyltrimethoxysilane (APTS) in ethanol.

4. The method of claim 1, wherein polymerizing the hydroxylated clay comprises:
   grafting the hydroxylated clay with a vinyl group to provide a vinyl-grafted hydroxylated clay;
   and polymerizing the vinyl-grafted hydroxylated clay with a monomer selected from the group consisting of 1-(4-sulfobutyl)-3-vinyl-1H-imidazole-3-ium butane-1-sulfonate (SBVI), acrylamidopropyl trimethylammonium chloride (APTAC), and 2-acrylamide-2-methylpropane sodium sulfate (AMPS-Na) to provide the clay-polymer composite.

5. The method of modifying natural clay of claim 1, wherein the clay is selected from the group consisting of Bentonite clay and Kaolinite clay.

6. The method of claim 1, wherein the hydrochloride and hydrogen nitrate mixture has a ratio of 3:1 v/v, respectively.

7. The method of claim 1, wherein the piranha solution comprises $H_2SO_4:H_2O_2$ having a ratio of at least about 3:1-7:1 v/v.

* * * * *